US005377321A

United States Patent [19]

Kaneko et al.

[11] Patent Number: 5,377,321

[45] Date of Patent: Dec. 27, 1994

[54] IMAGE FORMING APPARATUS HAVING SETTABLE INFERENCE RULES

[75] Inventors: Tokuharu Kaneko; Tadashi Suzuki, both of Yokohama, Japan

[73] Assignee: Canon Kabushiki Kaisha, Tokyo, Japan

[21] Appl. No.: 150,250

[22] Filed: Nov. 10, 1993

Related U.S. Application Data

[63] Continuation of Ser. No. 573,689, Aug. 28, 1990, abandoned.

[30] Foreign Application Priority Data

Sep. 1, 1989 [JP] Japan .................................. 1-224659
Sep. 1, 1989 [JP] Japan .................................. 1-224660

[51] Int. Cl.[5] .............................................. G06F 3/14

[52] U.S. Cl. ...................................... 395/163; 395/11; 395/900; 395/903; 355/206; 355/208

[58] Field of Search ....................... 395/3, 11, 61, 900, 395/903, 162, 163, 101; 355/206–208

[56] References Cited

U.S. PATENT DOCUMENTS 4,508,446 4/1985 Imai ..................................... 355/208
4,521,099 6/1985 Katayama et al. .................. 355/234
4,550,254 10/1985 Zomorrodi et al. ............. 250/338.1
4,613,227 9/1986 Honjo .................................. 355/233
4,618,242 10/1986 Yamagishi ........................... 355/282
4,669,862 6/1987 Yagasaki et al. ..................... 355/206
5,012,430 4/1991 Sakurai ................................. 395/11
5,029,314 7/1991 Katsumi et al. ...................... 355/208
5,034,772 7/1991 Suzuki ................................ 355/208
5,066,978 11/1991 Watarai et al. ...................... 355/206

FOREIGN PATENT DOCUMENTS 0268182 5/1988 European Pat. Off. .
0030372 6/1988 European Pat. Off. .
62-95677 5/1987 Japan .

*Primary Examiner*—Dale M. Shaw
*Assistant Examiner*—Kee M. Tung
*Attorney, Agent, or Firm*—Fitzpatrick, Cella, Harper & Scinto

[57] ABSTRACT

An image forming apparatus such as copying apparatus or laser beam printer in which each section of the apparatus is controlled by using a fuzzy inference. The apparatus comprises: processors to form an image; a detector to detect at least one state amount regarding the control of the processors; an inference operation unit to infer a control amount which is used in the control of the processors on the basis of the state amount; and a correction circuit to correct the delay amount of the control system in the inference. The processors include at least one of the charging device, exposing device, developing device, copy transfer device, paper feeding device, conveying device, fixing device, and image forming mode setting device. A predetermined value is added to or subtracted from the value obtained by the fuzzy inference so as to suppress the influence by the delay amount of the control system.

35 Claims, 18 Drawing Sheets

FIG. 6

(E is ZO and DE is PB and SP is ME) → H is NB
(E is PS and DE is PS and SP is ME) → H is NB
(E is PB and DE is ZO and SP is ME) → H is NS
(E is PS and DE is NS and SP is ME) → H is NS
(E is ZO and DE is NB and SP is ME) → H is PB
(E is NS and DE is NS and SP is ME) → H is PB
(E is NB and DE is ZO and SP is ME) → H is PS
(E is NS and DE is PS and SP is ME) → H is PS
(E is ZO and DE is ZO and SP is ME) → H is ZO
(E is PS and DE is ZO and SP is ME) → H is ZO
(E is ZO and DE is ZO and SP is LA) → H is PS
(E is ZO and DE is ZO and SP is SM) → H is NS

IMAGE FORMING APPARATUS HAVING SETTABLE INFERENCE RULES

This application is a continuation of application Serial No. 07/573,689, filed Aug. 28, 1990, now abandoned.

BACKGROUND OF THE INVENTION

Field of the Invention

The present invention relates to an image forming apparatus such as copying apparatus, laser beam printer, or the like and, more particularly, to an image forming apparatus for controlling each section in the apparatus by using a fuzzy inference.

Related Background Art

Hitherto, in a control unit of an image forming apparatus, a formulary control is executed on the basis of a definitive judgment according to state amounts.

For instance, for a fixing device in the image forming apparatus, generally, a temperature of fixing device is detected by a heat sensitive element such as a thermistor or the like and a heat source such as a heater or the like is controlled on the basis of a predetermined temperature level as a threshold level. That is, when the detected temperature is lower than 180 ° C., the heater is made conductive (turned on), and when the detected temperature is higher than 180° C., the conduction of the heater is stopped (turned off), or the like.

On the other hand, as an improvement method to reduce a fluctuation for a target temperature, various methods such that a heater ON-time is made variable in accordance with the present temperature and the like have been proposed.

However, in the image forming apparatus such as a copying apparatus or the like, generally, a fluctuation by circumstances is large and in many cases, the relation between the state amounts and the operation amounts is dominated by a vague relation. Therefore, in almost all of the cases, it is difficult to formulate the control as in the conventional example as the number of state amounts increases.

For example, in the temperature control of the fixing device, in the case where the state amounts such as room temperature, number of copy sheets, density of original, kind of recording medium (sheet type), temperature of fixing device itself, and the like fluctuate, the fixing capability to fix the toner which was copy transferred onto a copy transfer paper also complicatedly fluctuates. Such an experimental relation has been known. However, it is difficult to formulate the relations among the state amounts and the operation amounts. Practically speaking, degrees of heat radiation differ depending on the environment and the paper feeding/non-feeding states. When executing the control such as to turn off the fixing device when the temperature of fixing device itself is equal to or higher than a predetermined temperature and to turn on the fixing device when it is equal to or lower than the predetermined temperature as in the conventional apparatus, a temperature fluctuation (hereinafter, referred to as a temperature ripple) occurs, so that it is necessary to set the minimum value of the temperature ripple to a temperature enough to fix the toner to the copy transfer paper. Therefore, it is necessary to set a temperature adjustment set temperature to a value which is further slightly higher than an ideal temperature state. Consequently, there are problems such that a surplus electric power is consumed and it is necessary to use materials having a higher heat resistance as parts constructing the fixing device.

A technique to calculate operation amounts by executing a fuzzy inference to the vague relations among the state amounts and the operation amounts has been proposed by the same assignee as the assignee of the present invention in U.S. patent application Ser. No. 07/536,330 filed Jun. 7, 1990, now abandoned.

On the other hand, almost all of the control systems of the image forming apparatus execute what is called a feedback control such that an operation amount is determined to thereby control a control object and a degree of change of the operated amount of the control object by the operation amount is detected, thereby again deciding the operation amount. In such a feedback control system, it is unavoidable that a delay of the control system occurs in, particularly, the stabilization of the control response.

It is also considered that the delay of the control system is reflected into the fuzzy rules or membership functions in the fuzzy inference. However, even by using only such a method, it is difficult to sufficiently cope with a change in delay due to a variation in manufacturing of state amount detecting means or apparatus, an aging change, and the like.

The above problems are not limited to the fixing device. In an image forming apparatus of the electrophotographic type, such problems can also occur in, for instance, charging means, exposing means, copy transfer means, recording medium feeding means, conveying means, and the like.

The image forming apparatus is not always limited to the electrophotographic copying apparatus but the problem of the delay of the control system also similarly occurs in an ink jet printer, a thermal printer, and the like.

SUMMARY OF THE INVENTION

It is an object of the present invention to provide an image forming apparatus which can solve the above problems and makes a consideration to a delay of a control system.

To accomplish the above object, according to the invention, there is provided an image forming apparatus comprising: a plurality of processing means for forming an image;detecting means for detecting at least one state amount regarding a control of the processing means; an inference operation unit to infer a control amount which is used in the control of the processing means on the basis of the state amount; and correcting means for correcting a delay of a control system in the inference.

Another object of the invention is to improve the algorithm of a fuzzy inference.

To accomplish the above object, according to the invention, there is provided an image forming apparatus having a plurality of processing means for executing processes to form an image onto a material to be recorded, comprising: a detector to detect at least one state amount regarding the processes; a memory to store a rule to qualitatively make the state amount correspond to a control amount to control at least one of the processing means; a function storing memory to store a function in which the state amount and the control amount are expressed by at least one fuzzy set; interference operating means for inferring the control amount from the state amount in accordance with the rule; and correcting means for correcting a delay of a control system in the inference by the inference operating means.

According to the invention, there is also provided an image forming apparatus having a plurality of processing means for executing processes to form an image onto a material to be recorded, comprising: a detector to detect atleast one state amount regarding the processes; a memory to store a rule to qualitatively make the state amount correspond to a control amount to control at least one of the processing means; a function storing memory to store a function in which the state amount and the control amount are expressed by at least one fuzzy set; inference operating means for inferring the control amount from the state amount in accordance with the rule; and control means for controlling the rule which is used in the inference by the inference operating means in accordance with a delay of a control system.

The above and other objects and features of the present invention will become apparent from the following detailed description and the appended claims with reference to the accompanying drawings.

BRIEF DESCRIPTION OF THE DRAWINGS

FIG. 6 is an explanatory diagram showing fuzzy rules which can be applied to the embodiment;

DETAILED DESCRIPTION OF THE PREFERRED EMBODIMENTS

Embodiments of theinvention will be described in detail hereinbelow with reference to the drawings.

Embodiment 1

1. Control system (part 1)

Figure 1:
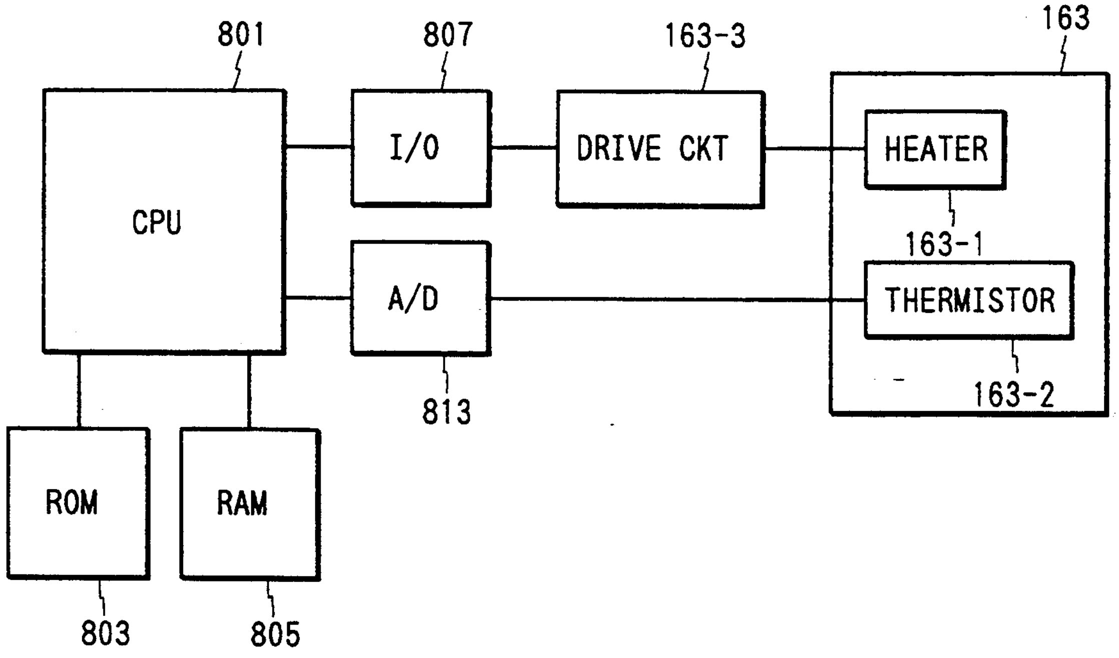
FIG. 1 relates to an embodiment of the present invention and is a fundamental block diagram showing an example of a construction of a control system in the case where the invention was applied to a fixing device.

FIG. 1 shows an embodiment in which the invention was applied to a fixing device of an image forming apparatus. Reference numeral 801 denotes a CPU, which will be explained hereinlater, for actually executing arithmetic operations of a fuzzy inference. Reference numeral 803 denotes a ROM, which will be explained hereinlater, for storing fuzzy rules and membership functions (functionsin each of which a state amount and a control amount are expressed by at least one fuzzy set). Reference numeral 805 denotes a RAM which will be explained hereinlater. The RAM 805 is used as a work area when a fuzzy inference is executed. Reference numeral 807 indicates an input/output section (I/O) which will be explained hereinlater; 813 an A/D converter to convert an analog signal into a digital signal; 163 a fixing device for fixing an image by heating a recording medium such as a paper or the like which was conveyed; 163-1 a heater to apply a heat to a fixing roller; 163-2 a thermistor to detect a temperature of a fixing heater; and 163-3 a drive circuit to drive the fixing roller in accordance with a command from the CPU 801.

2. Internal construction of the image forming apparatus

Figure 2:
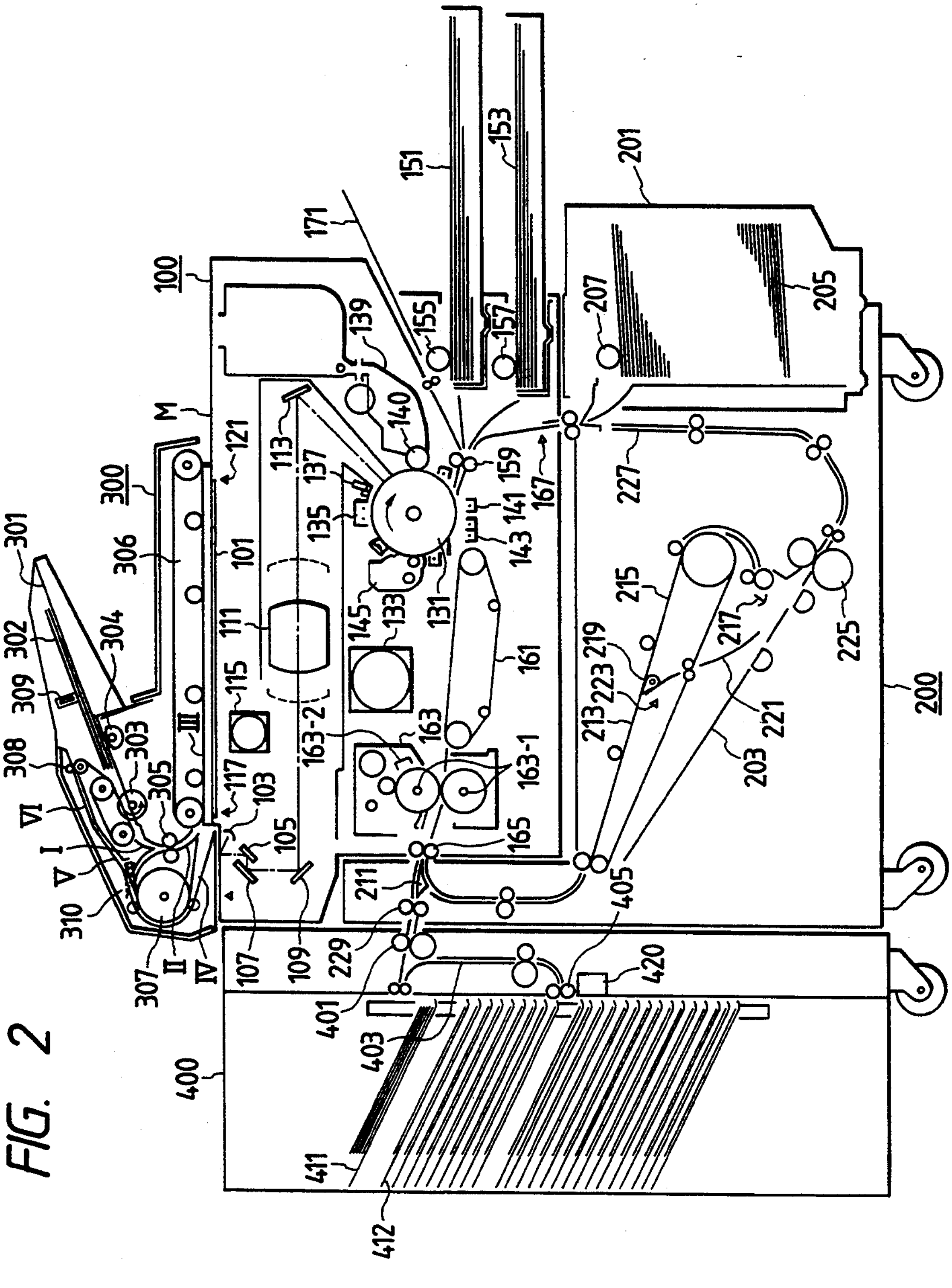
FIG. 2 is a cross sectional view showing an example of a whole internal construction of an image forming apparatus according to the embodiment.

FIG. 2 shows an example of an internal construction of the image forming apparatus according to the embodiment. In FIG. 2, reference numeral 100 denotes a main body having the image reading function and the image recording function; 200 indicates a pedestal having the both-sided processing function to turn over the recording medium (paper) in the both-sided recording mode and the multiplex recording function to execute the recording a plurality of times to the same recording medium; 300 a recyclable automatic document feeder (hereinafter, referred to as an RDF) to automatically feed an original; and 400 a staple sorting apparatus (hereinafter, referred to as a staple sorter). The above apparatuses 200, 300, and 400 can be freely combined and used tothe main body 100.

(A) With respect to the main body (100)

In the main body 100, reference numeral 101 denotes an original support glass on which an original is placed;

103 indicates an illuminating lamp (exposing lamp) to illuminate the original; 105, 107, and 109 scanning reflecting mirrors (scanning mirrors) each for changing the optical path of the reflected light from the original; 111 a lens having an in-focus function and a variable magnification function; 113 a fourth reflecting mirror (scanning mirror) to change the optical path; 115 optical system motor to drive the optical system; and 117, 119, and 121 sensors.

Reference numeral 131 denotes a photo sensitive drum; 133 a main motor to drive the photo sensitive drum 131; 135 a high-voltage unit; 137 blank exposure unit; 139 a developing device; 141 a copy transfer charging device; 143 a separating charging device; and 145 a cleaning device;

Reference numeral 151 denotes an upper stage cassette; 153 a lower stage cassette; 171 a hand-insertion pick-up port; 155 and 157 pick-up rollers; 159 registration rollers; 161 a conveying belt to convey a recording paper on which an image was recorded to the fixing side; 163 a fixing device to fix the conveyed recording paper by a thermal fixing process; and 167 a pedestal sensor (a recording paper sensor) which is used in the both-sided recording mode.

The surface of the photo sensitive drum 131 is made of a seemless photo sensitive material using both of a photo conductive material and a conductive material. The drum 131 is axially rotatably supported and starts the rotation in the direction indicated by an arrow in the diagram by the main motor 133 which operates in response to the depression of a copy start key, which will be explained hereinlater. After completion of a predetermined rotation control of the drum 131 and a potential control process (pre-processing), the original put on the original support glass 101 is illuminated by the illuminating lamp 103 which is constructed integratedly with the first scanning mirror 105. The reflected light of the original passes through the first scanning mirror 105, second scanning mirror 107, third scanning mirror 109, lens 111, and fourth scanning mirror 113 and form an image onto the drum 131.

The drum 131 is corona charged by the high-voltage unit 135. After that, the image (original image) which was illuminated by the illuminating lamp 103 is slit exposed. An electrostatic latent image is formed onto the drum 131 by a well-known Carlsont's process.

The electrostatic latent image on the drum 131 is developed by a developing roller 140 of the developing device 139 and is visualized as a toner image. The toner image is copy transferred onto a copy transfer paper by the copy transfer charging device 141 as will be explained hereinlater.

That is, the copy transfer paper in the upper stage cassette 151 or lower stage cassette 153 or the copy transfer paper set in the hand-insertion pick-up port 171 is fed into the main body of the apparatus by the pick-up roller 155 or 157. The top (edge) of the latent image and the top (edge) of the copy transfer paper are made coincident. After that, the copy transfer paper passes through the portion between the charging device 141 and the drum 131 and is delivered to the outside of the main body 100.

The drum 131 after completion of the copy transfer subsequently continues the rotation and the surface of the drum 131 is cleaned by the cleaning device 145 which is constructed by a cleaning roller and an elastic blade.

(B) With respect to the pedestal (200)

The pedestal 200 can be detached from the main body 100 and has a deck 201 in which 2000 copy transfer papers can be enclosed and an intermediate tray 203 for both-sided copy. A lifter 205 of the deck 201 which can enclose 2000 papers is elevated in accordance with a quantity of copy transfer papers in a manner such that the copy transfer paper is always come into contact with a pick-up roller 207.

On the other hand, reference numeral 211 denotes a copy delivery flapper for switching the path on the both-sided recording side or the multiplex recording side and the path on the delivery side. Reference numerals 213 and 215 denote conveying paths of the conveying belt; and 217 an intermediate tray weight for pressing the copy transfer paper. The copy transfer paper which has passed through the delivery flapper 211 and conveying paths 213 and 215 is turned over and enclosed into the intermediate tray 203 for both-sided copy. Reference numeral 219 denotes a multiplex flapper for switching the path for both-sided recording and the path for the multiplex recording. The multiplex flapper is arranged between the conveying paths 213 and 215. By upwardly rotating the multiplex flapper, the copy transfer paper is led to a conveying path 221 for multiplex recording. Reference numeral 223 denotes a multiplex copy delivery sensor to detect the final edge of the copy transfer paper which passes through the multiplex flapper 219; 225 pick-up rollers to feed the copy transfer paper to the side of the drum 131 via a path 227; and 229 delivery rollers to deliver the copy transfer paper to the outside of the apparatus.

In the both-sided recording (both-sided copy) mode or the multiplex recording (multiplex copy) mode, the copy delivery flapper 211 of the main body 100 is first lifted up, thereby storing the copy transfer paper after completion of the copy into the intermediate tray 203 through the conveying paths 213 and 215 of the pedestal 200. At this time, the multiplex flapper 219 is lifted down in the both-sided recording mode and is lifted up in the multiplex recording mode. For instance, up to 99 copy transfer papers can be stored into the intermediate tray 203. The copy transfer papers stored in the tray 203 are depressed by the weight 217.

In the back-side recording mode or the multiplex recording mode which is then executed, the copy transfer papers stored in the tray 203 are led one by one from the lower position to the registration rollers 159 of the main body 100 via the path 227 by the operations of the pick-up rollers 225 and the weight 217.

(C) With respect to the RDF (recyclable automatic document feeder) (300)

In the RDF 300, reference numeral 301 denotes a mounting tray to set a bundle of originals 302. First, in the case of one-sided originals, the originals are separated one by one from the lowest portion of the original bundle 302 by a semilunar roller 304 and a separating roller 303. The separated original passes along paths I to II until an exposing position of the platen glass 101 and is conveyed and stopped by conveying rollers 305 and a whole surface belt 306. After that, the copy operation is started. After completion of the copy operation, the original on the platen glass 101 passes along paths III and IV and is sent to paths V and VI by a large conveying roller 307 and is further again returned to the top surface of the original bundle 302 by a delivery roller 308.

Reference numeral 309 denotes a recycle lever to detect one circulation or the original. At the start of the feeding operation of the original, the recycle lever 309 is put on the upper portion of the original bundle. When the originals are fed and the rear edge of the last original goes through the recycle lever 309, the last original drops onto the tray 301 due to the weight of the original, so that one circulation of the original is detected.

Then, in the case of the both-sided original, the original is once led from the paths I and II to the path III as mentioned above and after completion of the copy operation, a switching flapper 310 which can be driven is switched, thereby leading the top edge of the original to the path. The original passes along the path II by the conveying rollers 305 and is conveyed and stopped onto the platen glass 101 by the whole surface belt 306. That is, the original is reversed by the route of the paths III—IV—II by the rotation of the large conveying roller 307.

On the other hand, by conveying the bundle of originals 302 one by one along the paths I—II—III—IV—V—VI until the single circulation is detected by the recycle lever 309, the number of originals can be also counted.

(D) With respect to the staple sorter (sorting device with a staple) (400)

The staple sorter 400 has a fixed non-sorting tray 411 of 20 bins and executes a sorting operation.

In the sorting mode, the copied sheets are sequentially delivered from the delivery rollers 229 of the main body and are led to conveying rollers 401 of the sorter 400 and pass through a conveying path 403 and are delivered from delivery rollers 405 to each of the bins of trays 412. Each time the copied sheet is delivered to the tray 412, the bins are vertically moved by a bin shift motor (not shown), thereby sorting the copied sheets. On the other hand, when the staple mode is selected and a staple signal is input from the main body 100, a stapling device 420 staples the sheets of each bin while moving one bin by one by a bin shift motor.

3. Operation panel

Figure 3:
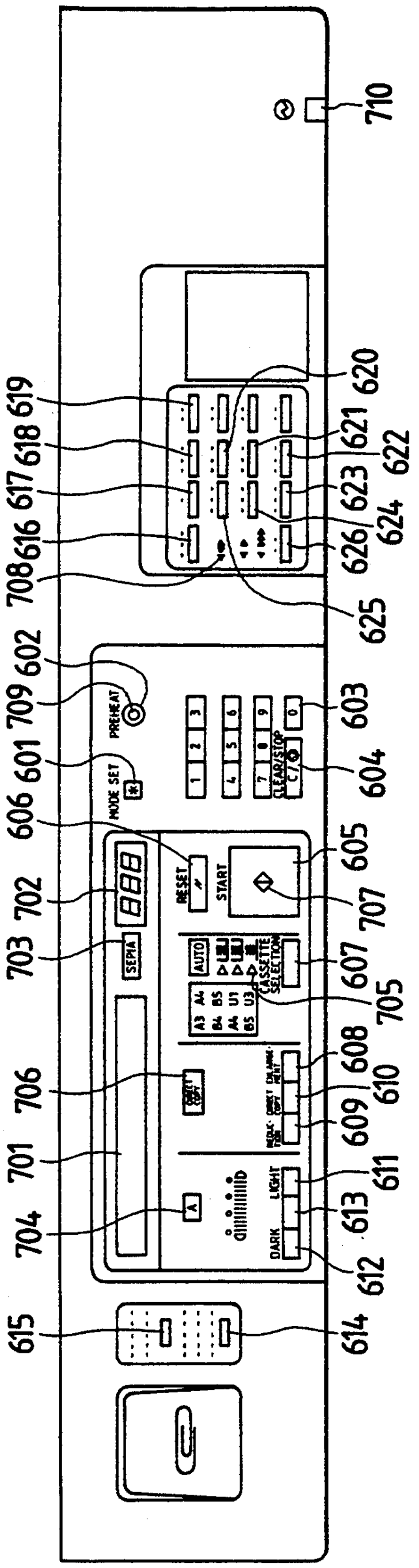
FIG. 3 is a plan view showing an example of an external construction of an operation panel in the embodiment.

FIG. 3 shows an example of a construction of an arrangement of the operation panel provided for the main body 100. The operation panel has a group of keys 600 and a group of displays 700 as will be explained hereinlater.

(A) With respect to the group of keys (600)

In FIG. 3, reference numeral 601 denotes an asterisk(*) key which is used in a setting mode in which the operator (user) sets a binding margin amount and a trimming size of original. Reference numeral 606 denotes an all reset key which is depressed when the operating mode is returned to the standard mode. The key 606 is also used to return the operating mode from the auto shut-off mode to the standard mode.

Reference numeral 605 denotes a copy start key which is depressed to start the copy operation.

Reference numeral 604 indicates a clear/stop key having the function of a clear key in the standby mode and the function of a stop key during the copy recording operation. The clear key is also used to reset the set number of copy sheets. On the other hand, the stop key is depressed to interrupt the serial copy mode. After the copy operation at the time point of the depression of the key 604 was finished, the copy operation is stopped.

Reference numeral 603 denotes a ten-key which is depressed to set the number of copy sheets. The ten-key is also used to set the asterisk (*) mode. Reference numeral 619 denotes a memory key. By operating the key 619, the user can register the modes which he frequently uses. In the example, four kinds of modes $M_1$ to $M_4$ can be registered.

Reference numerals 611 and 612 denote copy density keys which are depressed to manually adjust the copy density; 613 indicates an AE key which is depressed to automatically adjust the copy density in accordance with a density of original or is depressed to reset the AE (automatic density adjustment) mode and to manually switch the density adjustment; and 607 a cassette selection key which is depressed to select either one of the upper stage cassette 151, the lower stage cassette 153, and the lower stage paper deck 201. When originals are set in the RDF 300, an APS (automatic paper cassette selection) mode can be selected by depressing the key 607. When the APS is selected, the cassette of the sheets of the same size as the original is automatically selected.

Reference numeral 610 indicates a direct copy key which is depressed to obtain a copy of the equal magnification (original size). Reference numeral 616 denotes an automatic variable magnification key which is depressed to designate the function to automatically reduce or enlarge the image of the original in accordance with the size of copy transfer paper which was designated.

Reference numeral 626 denotes a both-sided copy key which is depressed when obtaining a both-sided copy from a one-sided original, a both-sided copy from a both-sided original, or a one-sided copy from a both-sided original. Reference numeral 625 denotes a binding margin key. By depressing the key 625, a binding margin of a designated length can be formed on the left side of the copy transfer paper. Reference numeral 624 denotes a photograph key which is depressed when a photograph original is copied and 623 indicates a multiplex key which is depressed to form (synthesize) images from two originals onto the same surface of a copy transfer paper.

Reference numeral 620 denotes an original trimming key which is depressed when the user executes the trimming of a fixed size original. At this time, the size of original is set by the asterisk key 601. Reference numeral 621 indicates a sheet trimming key which is depressed when the .user executes the trimming of an original in accordance with the cassette size.

Reference numeral 614 indicates a delivery method selection key to select a delivery method such as staple, sort, or group. For the sheets after completion of the recording, if a stapler is connected, the stapling mode and the sorting mode can be selected or the selected mode can be cancelled and if a sorting tray (sorter) is connected, the sorting mode and the grouping mode can be selected or the selected mode can be cancelled.

Reference numeral 615 denotes a paper folding selection key. By depressing the key 615, either one of the Z-folding mode in which the recorded sheet of the A3 or B4 size is folded so as to have a Z-shaped cross section and the half-folding mode in which the recorded sheet of the A3 or B4 size is folded into the half size can be selected and the selected mode can be cancelled.

(B) With respect to a group of displays (700)

In FIG. 3, reference numeral 701 denotes a message display of the LCD (liquid crystal display) type to display information regarding the copy. For instance, one character is constructed by 5×7 dots. A message or a copy magnification which was set by fixed size variable magnification keys 608 and 609, the direct copy key 610, or zoom keys 617 and 618 can be displayed by 40 characters. The display 701 uses a semi transmission type liquid crystal. Two colors are used as a back light. In the ordinary mode, the green back light is lit on. In the abnormal state or a state in which the copy cannot be executed, the orange back light is lit on.

Reference numeral 706 denotes a direct copy display which is lit on when the direct copy mode is selected; 703 indicates a color developing device display to display the number of copy sheets or a self diagnosis code; and 705 a using cassette display to display which one of the upper stage cassette 151, lower stage cassette 153, and lower stage deck 201 has been selected.

Reference numeral 704 indicates an AE display which is lit on when the AE (automatic density adjustment) mode is selected by the AE key 613. Reference numeral 709 denotes a preheat display which is lit on when obtaining a both-sided copy from a both-sided original or a both-sided copy from a one-sided original.

When the RDF 300 is used in the normal mode, the number of copy sheets is set to one, the AE mode of the density is set, the auto paper selection mode is set, the direct copy mode is set, and the mode to obtain a one-sided copy from a one-sided original is set. In the normal mode when the RDF 300 is not used, one copy sheet, the manual density mode, the direct copy mode, the mode to obtain a one-sided copy from a one-sided original are set. A discrimination regarding whether the RDF 300 is used or not is made by checking whether originals have been set to the RDF 300 or not.

Reference numeral 710 denotes a power source lamp which is lit on when a power switch (not shown) is turned on.

4. Control system (part 2)

Figure 4:
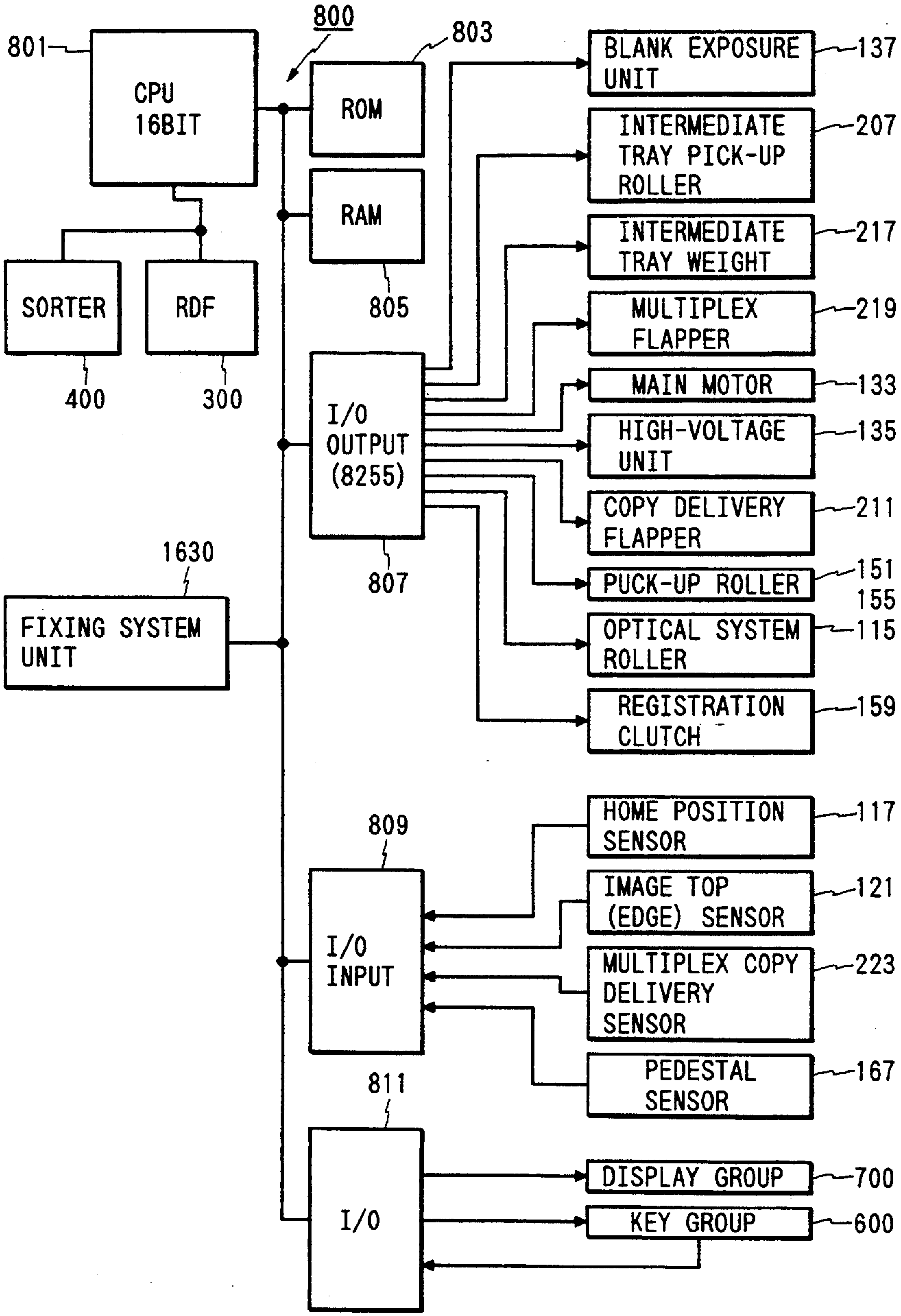
FIG. 4 is a block diagram showing an example of a whole circuit construction of a control system according to the embodiment.

FIG. 4 shows an example of a construction of a control unit 800 in the embodiment of FIG. 2. In FIG. 4, reference numeral 801 denotes the central processing unit (CPU) to execute arithmetic operations to perform controls, which will be explained hereinlater. For instance, a 16-bit microcomputer such as V50 made by NEC Corporation or the like can be used as a CPU 801. Reference numeral 803 denotes the ROM (read only memory) in which control procedures (control programs) according to the embodiment have previously been stored. The CPU 801 controls various constructing apparatuses on the basis of the programs stored in the ROM 803. Reference numeral 805 denotes the RAM (random access memory) as a main storage which is used as a work storage memory or the like to store input data, results of the arithmetic operations, and the like.

Reference numeral 807 denotes the interface (I/O) for output signal transfer to output control signals of the CPU 801 to loads such as main motor 133 and the like; 809 an interface for input signal transfer to input signals of the image top sensor 121 and the like and to send to the CPU 801; and 811 an interface to control the input and output of the key group 600 and the display group 700. An input/output circuit port μPD8255 made by NEC Corporation, for instance, can be used as each of the interfaces 807, 809, and 811.

The display group 700 corresponds to each display shown in FIG. 3 and uses, for instance, LED (light emitting diodes) or LCD (liquid crystal displays). On the other hand, the key group 600 relates to each key shown in FIG. 3 and is constructed in a manner such that the CPU 801 can know which one of the keys was depressed on the basis of a well-known key matrix. On the other hand, reference numeral 1630 denotes a fixing system unit including the components 183, 807, 813, and the like in FIG. 1.

5. Operation example

Explanation will now be made with respect to an example of the control operation of a temperature as an amount to be controlled in the case where the present invention was applied to the fixing device as a control object of the image forming apparatus. The following three state amounts, for instance, are used when the temperature control is executed.

① Temperature deviation between a target temperature and the present temperature ② Temperature inclination as a temperature change amount per unit time ③ Area of the paper (recording medium) which passes through the fixing device per unit time On the other hand, for example, the following operation amount is used when the temperature control is executed.

④ ON time of the heater 163-1

FIG. 5 shows membership functions to specify fuzzy sets with respect to each of the stage amounts and operation amount shown In ① to ④. That is, each of the temperature deviation, temperature inclination, paper area, and heater ON time belongs at least one of the several fuzzy sets which are specified by those amounts and the degrees (hereinafter, referred to as conformities) to which the amounts belong.

In the case of the temperature deviation, temperature inclination, and heater ON time, 1) NB (Negative Big) Negative value and its absolute value is big
2) NS (Negative Small) Negative value and its absolute value is small
3) ZO (Zero) Near 0
4) PS (Positive Small) Positive value and its absolute value is small
5) PB (Positive Big) Positive value and its absolute value is big On the other hand, with respect to the paper area, 1) SM (SMALL): Small area
2) ME (MEDIUM): Medium size
3) LA (LARGE): Large area The conformity for each set is expressed by the values of 0 to 1.

Figure 5A:
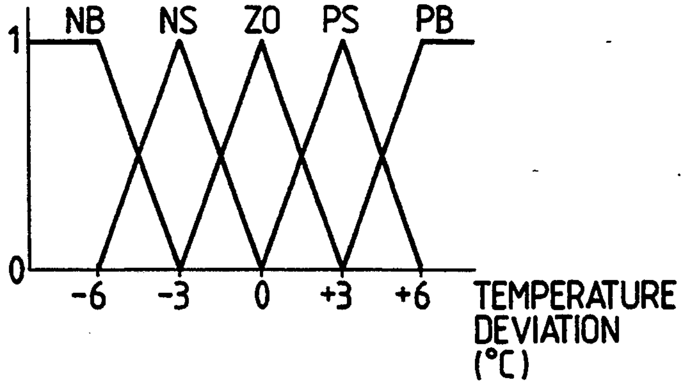
FIGS. 5A to 5D are diagrams for explaining membership functions which can be used in the embodiment.
Figure 5B:
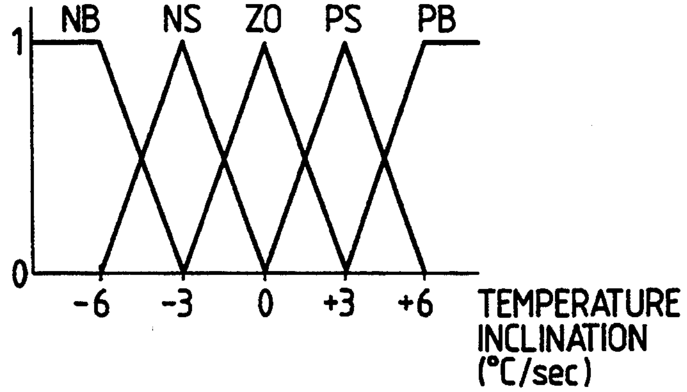
Figure 5C:
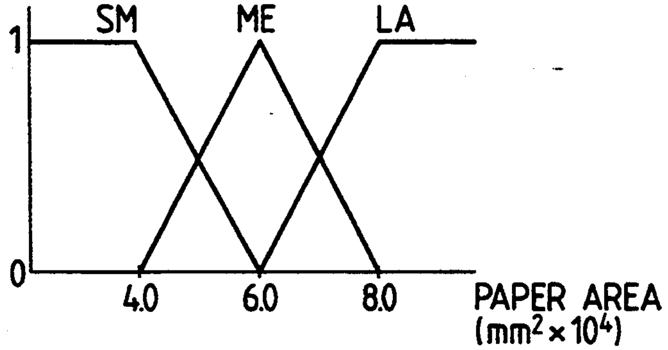
Figure 5D:
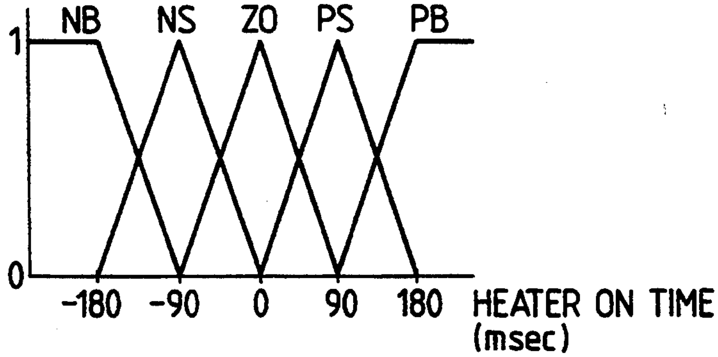

In FIGS. 5A to 5D, FIG. 5A shows membership functions of the temperature deviation, FIG. 5B shows membership functions of the temperature inclination; FIG. 5C shows membership functions of the paper area, and FIG. 5D shows membership functions of the heater ON time, respectively.

The case of the temperature deviation shown in FIG. 5A will now be more practically explained as an example. For instance, the conformity for the set ZO of the temperature deviation of 0° C. is set to 1.0 and the conformities for the other sets are set to 0. On the other hand, for instance, the conformities for the sets ZO and PS in which the temperature deviation is set to 1.5° C.

are equal to 0.5, respectively, and the conformities for the other sets are equal to 0. The same shall also apply to the other values of the temperature deviations and the other state amounts or operation amounts.

It will be obviously understood that limits of the intervals where the membership functions NB, SM, PB, and LA among the membership functions of the state amounts or operation amounts shown in FIGS. 5A to 5D are defined have been determined by the values which are proper on the controlalthough they are not clearly shown in the diagrams.

In the membership function of the heater ON time shown in FIG. 5D, if the ON time has a negative value, the heater is turned off for only such a negative ON time.

Explanation will now be made with respect to a method of calculating the heater ON time as an operation amount by a fuzzy inference on the basis of the state amounts of the temperature deviation, temperature inclination, and paper area.

To determine the heater ON time, for instance, the following fuzzy rules called rules are used.

(Rule 1)

If temperature deviation=PB, and temperature inclination=ZO, and paper area=
then heater ON time=NS (Rule 2)

If temperature deviation=PS, and temperature inclination=ZO, and paper area=ME,
then heater ON time=ZO The above fuzzy rules are not set by a mechanical combination of the membership functions shown in FIG. 5 but are properly set in accordance with a control object, control environment, and the like. FIG. 6 shows an example of fuzzy rules which are set in the case of the control of the fixing device in the embodiment. In FIG. 6, E denotes a temperature deviation, DE indicates a temperature inclination, SP a paper area, and H a heater ON time.

Figure 7:
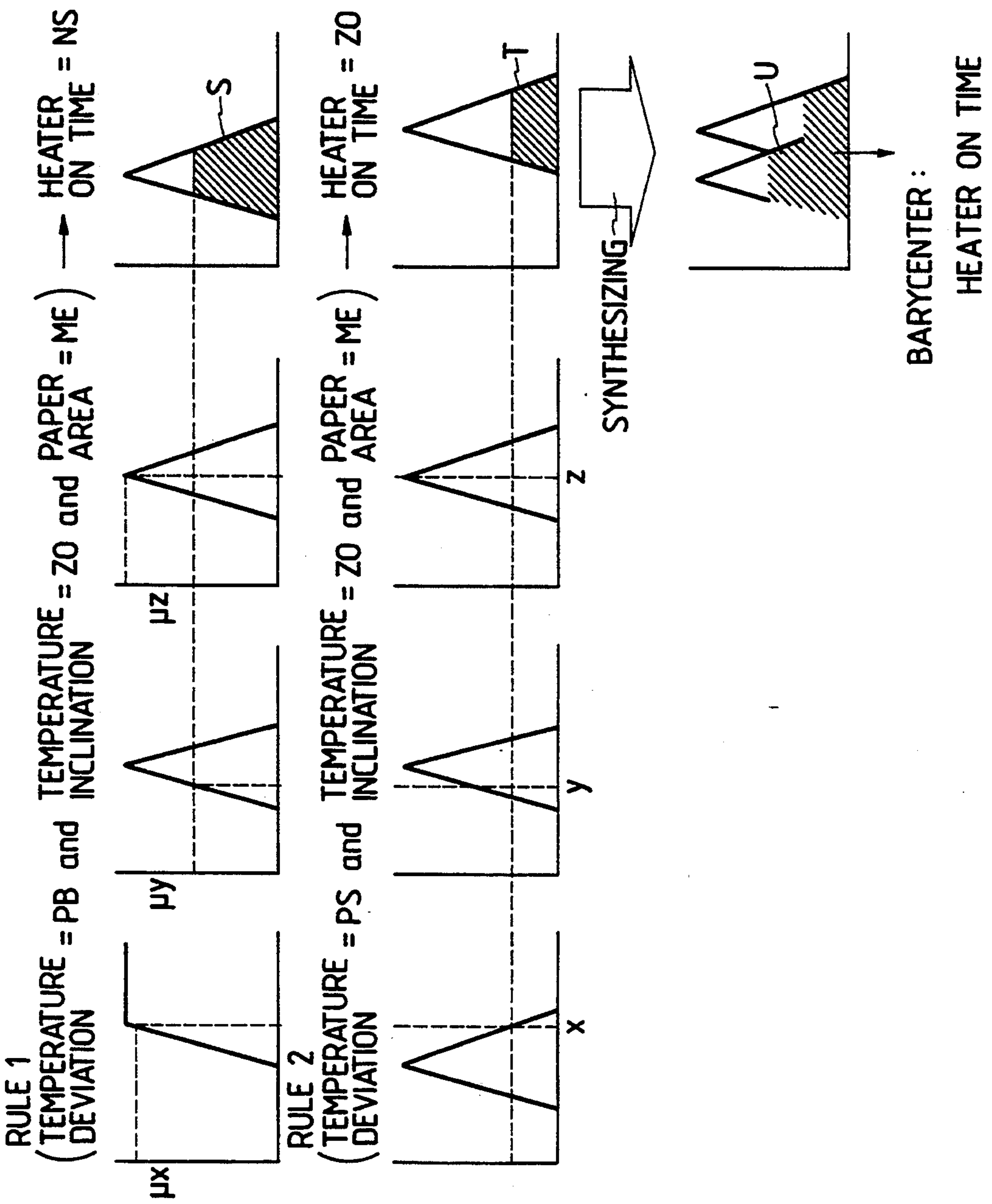
FIG. 7 is an explanatory diagram for explaining a method of a fuzzy inference according to the embodiment of the invention.

FIG. 7 shows an example in the case of calculating the heater ON time by the fuzzy inference by using the above rules 1 and 2.

The case where the inputs of the state amounts are respectively set such that the temperature deviation=x, the temperature inclination=y, and the paper area=z will now be considered.

In the rule 1, the input x is included in the set PB at a conformity $\mu_x$ by the membership functions of the temperature deviation, the input y is included in the set ZO at a conformity $\mu_y$ by the membership functions of the temperature inclination, and further, the input z is included in the set ME at a conformity $\mu_z$ by the membership functions of the paper area.

First, the AND of the conformities $\mu_x$, $\mu_y$, and $\mu_z$, that is, the minimum value in this case is calculated in accordance with the antecedent parts of the rules. As will be obviously understood from the diagram, the minimum value which will be obtained is $\mu_y$ and this value is used as a comformity of the antecedent part of the rule 1. Then, in order to reflect the conformity to the fuzzy set of the consequent part, the AND of the resultant conformity $\mu_y$ and the membership function NS of the heater ON time is calculated, thereby obtaining a fuzzy set as a result of the inference of the rule 1. The inference result is shown as a peripheral portion in which the base of a hatched portion S was eliminated.

In the rule 2, the similar calculation is also executed and an inference result of a fuzzy set which is shown as a peripheral portion in which the base of a hatched portion T was eliminated is obtained.

After that, to obtain the final inference result from the inference result of each rule, the OR of the set regarding the hatched portion S and the set regarding the hatched portion T, in this case, the maximum value is calculated. A new fuzzy set which is shown by a peripheral portion in which the base of a hatched portion U was eliminated is derived as a final inference result.

In the actual control, since a specified value is necessary as an output of the fuzzy inference, further, a barycenter with respect to the heater ON time of the set is calculated and the resultant value is set as a heater ON time which was derived by the fuzzy inference.

The kinds of rules and the number of rules which are used in the inference are not limited to those in the foregoing embodiment because the dominant rule is properly determined from the rules shown in FIG. 6, in accordance with the state amounts, that is, the values of inputs x, y, and z.

Then, a predetermined coefficient is multiplied to the result obtained by the fuzzy inference in order to correct the delay of the control system. In the embodiment, a value smaller than "1" is multiplied to the heater ON timeto suppress the influence by the delay. That is, the heater is turned on or off for only a time shorter than the result obtained by the fuzzy inference due to this. By previously suppressing the operation amount and giving, the delay amount of the control system which appears in the output of the control system can be suppressed.

In the embodiment of the invention, the correction coefficients are stored into the RAM 805. Initial values of the correction coefficients are individually determined for the apparatuses at the time of the shipping from the factory. After that, to reflect a change in delay amount due to aging changes of a temperature detecting thermistor, a fixing heater, and the like, the correction coefficients are changed in accordance with a function shown in FIG. 8.

Figure 8:
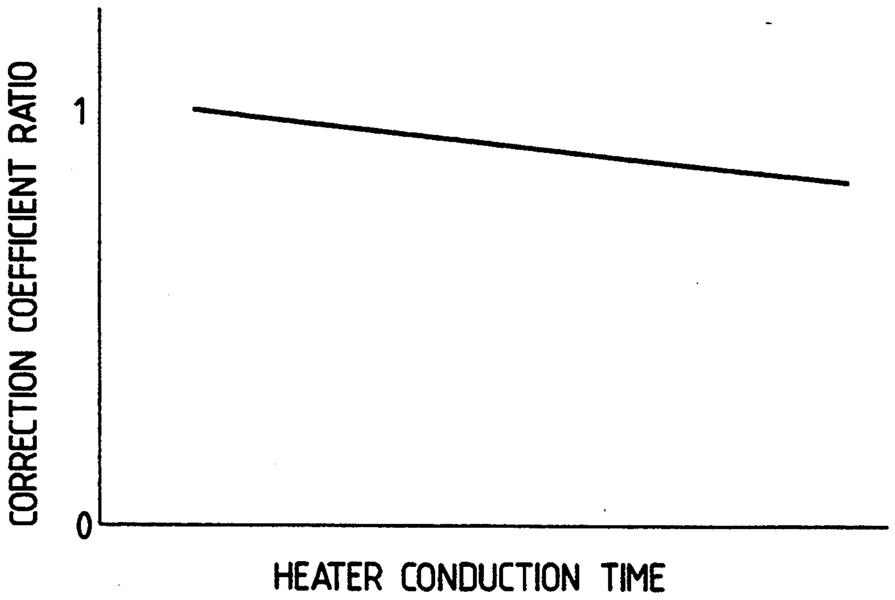
FIG. 8 is a graph showing a ratio of a correction coefficient to an initial set value according to the embodiment.

The function of FIG. 8 shows a ratio to the value upon initialization.

That is, a table of the relation shown in FIG. 8 is provided in the ROM 803. Means for integrating the total conduction time of the heater in the apparatus is provided. For instance, when the power supply is turned on or the like, the correction coefficient at that time is obtained by reference to the table on the basis of the value of the integrating means.

6. Control means

Figure 9:
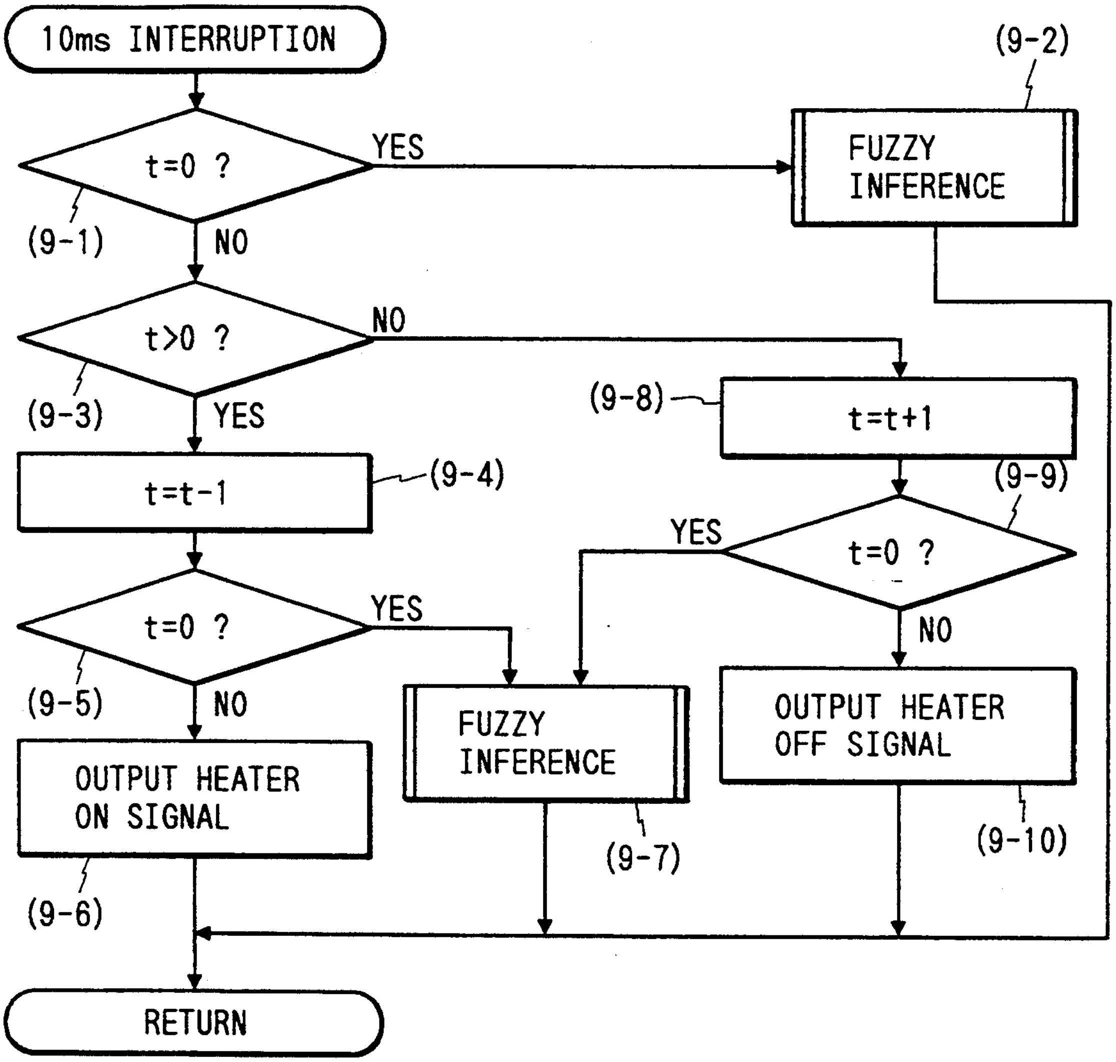
FIG. 9 is a flowchart showing an example of a control procedure of a control object (heater) according to the embodiment.

A control procedure of the embodiment will now be described with reference to FIG. 9. FIG. 9 shows an example of the control procedure which is activated by an interrupting process by a pulse which is generated every predetermined time (10 msec in the example).

Figure 10:
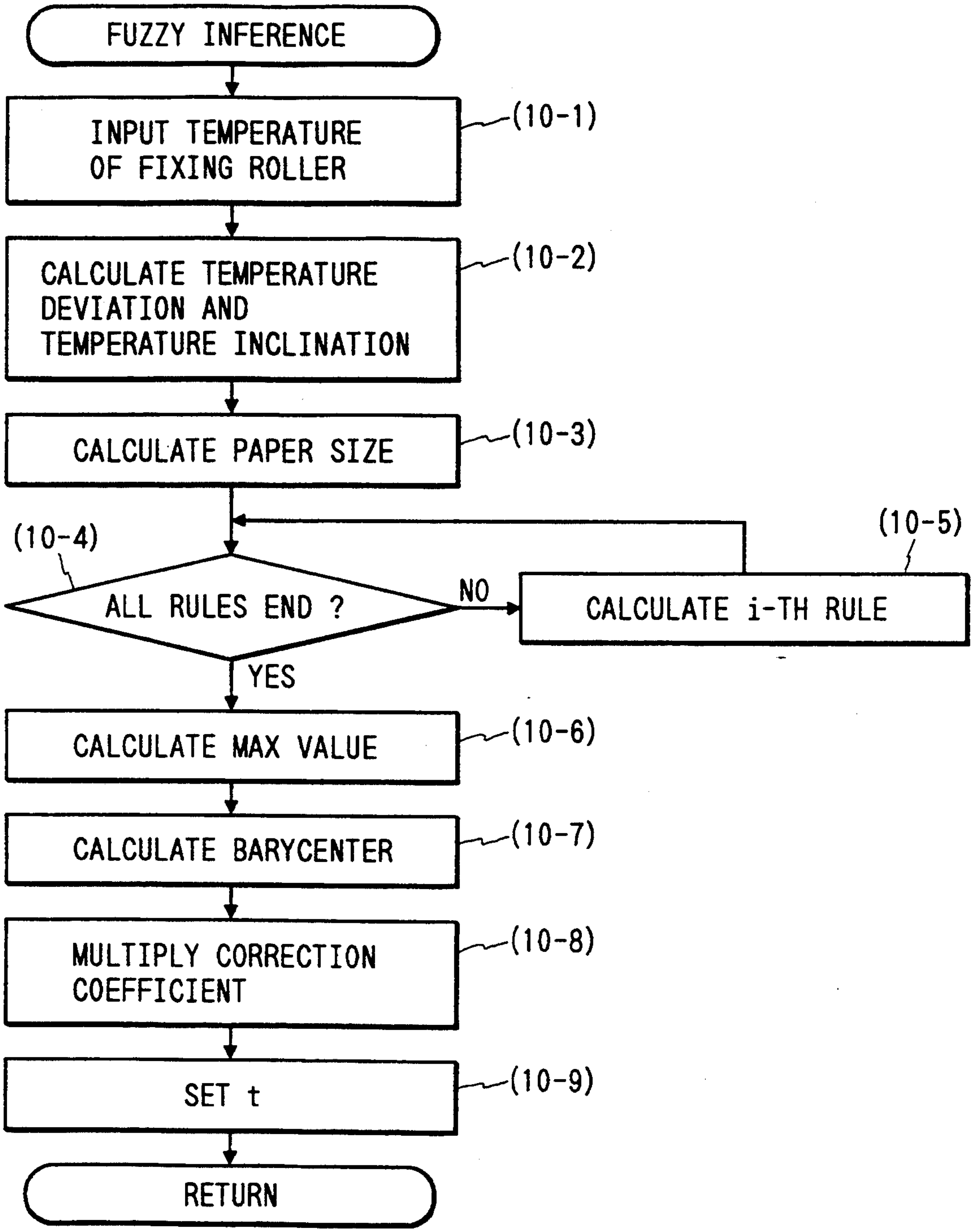
FIG. 10 is a flowchart showing an example of a fuzzy inference procedure according to the embodiment.

First, on the basis of a heater ON time t (t is set as a value in which 10 msec is used as a unit) which is set by a control procedure shown in FIG. 10, a check is made to see if t is equal to 0 or not (step 9-1). If YES, a fuzzy inference subroutine to set the heater ON time t by the fuzzy inference is called and, thereafter, the processing routine is returned.

On the other hand, if NO in the discrimination step 9-1, a check is made to see if the heater ON time t is positive or negative (step 9-3). If it is positive, "1" is subtracted from the value of t (step 9-4). After that, a check is made to see if the heater ON time t is equal to 0 or not (step 9-5). If YES in step 9-5, a fuzzy inference subroutine in step 9-7 is called. After that, the processing routine is returned. If NO in step 9-5, a heater ON signal is output (step 9-6) and the processing routine is returned.

If t is negative in the discrimination step 9-3, "1" is added to the value of t (step 9-8). After that, a check is made to see if t is equal to 0 or not (step 9-9). If YES, the fuzzy inference subroutine in step 9-7 is called. After that, the processing routine is returned. If NO in step 9-9, a heater OFF signal is output (step 9-10) and the processing routine is returned.

A control procedure of the fuzzy inference subroutine will now be described with reference to a flowchart of FIG. 10.

First, a temperature of fixing roller is measured by the thermistor 163-2 (step 10-1). A deviation of the present temperature to a target temperature and a temperature inclination as a temperature change per unit time are calculated (step 10-2).

On the other hand, an area of paper which passes through the fixing roller per unit time is calculated on the basis of the paper size which was designated by the user or the RDF 300 (step 10-3).

After that, a fuzzy set, that is, a conformity of the operation amount to which a conformity for the fuzzy set of the state amounts was reflected in accordance with each fuzzy rule is calculated by the foregoing method with respect to the set fuzzy rule (steps 10-4 and 10-5). The maximum value of the fuzzy sets obtained by the respective rules is calculated (step 10-6). The operation amount of the highest possibility is calculated by obtaining the barycenter (step 10-7). The correction coefficient mentioned above is multiplied to the calculated value (step 10-8) and is set as a heater ON time t (step 10-9).

The heater ON time t is used when the heater ON time is controlled in the interruption of 10 msec and a value in which 10 msec is used as a unit is set as mentioned above.

Embodiment 2

Another embodiment of the means for changing the operation amount calculated by the fuzzy inference in accordance with a predetermined rule in order to correct the delay of the control system will now be described hereinbelow.

That is, in the embodiment 2, a predetermined value is added to or Is subtracted from the result obtained by the fuzzy inference. The adding or subtracting process is executed in such a direction as to suppress the influence by the delay. That is, when the calculated value is positive, the subtraction is executed. When it is negative, the addition is performed.

Figure 11:
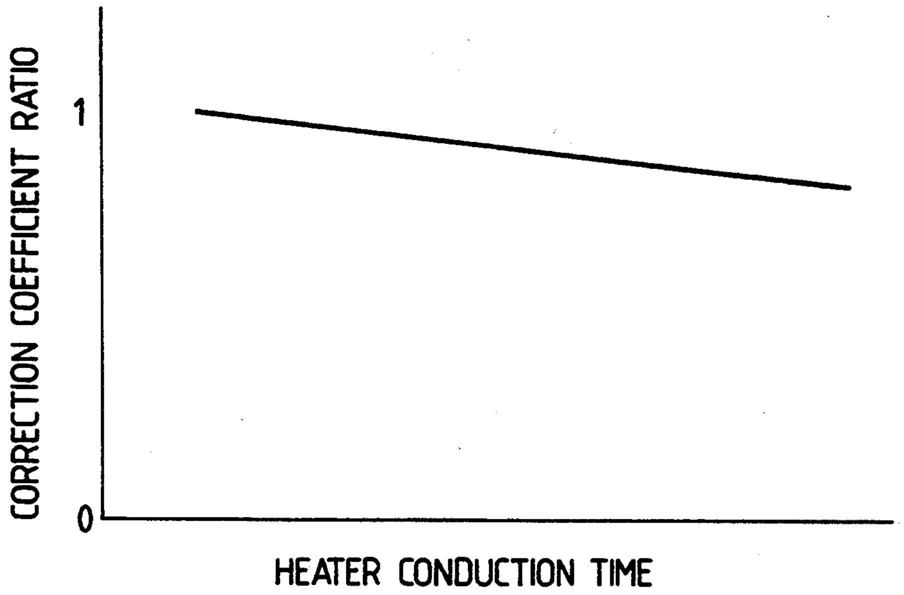
FIG. 11 is a graph showing a ratio of a correction value to an initial set value according to the second embodiment of the invention.

The correction coefficient is also stored into the RAM 805 in a manner similar to the embodiment 1. The value of the correction coefficient is decided at the time of the shipping from the factory. After that, the correction coefficient is changed in accordance with a function shown in FIG. 11 to reflect a change in delay amount due to aging changes of the thermistor and the like.

Figure 12:
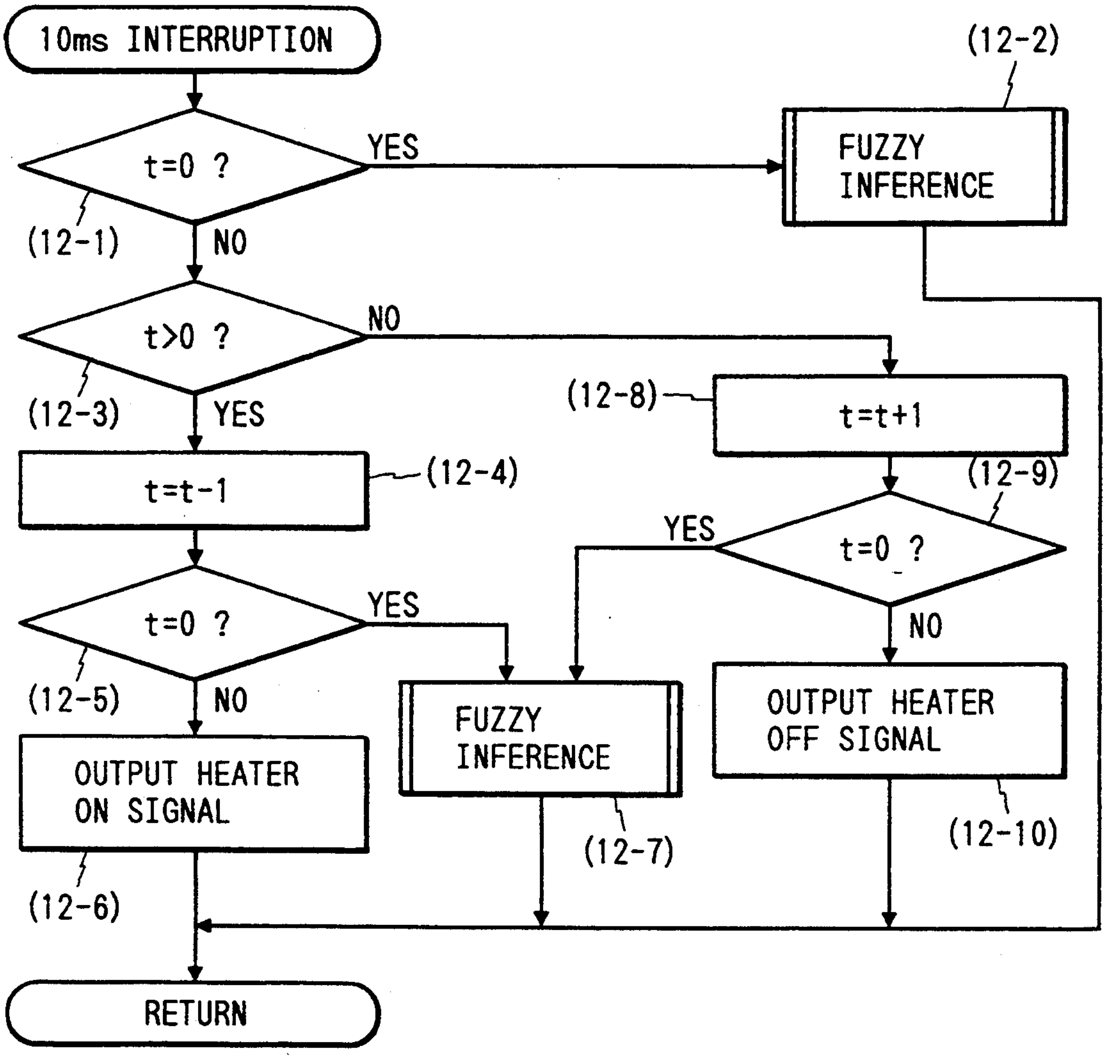
FIG. 12 is a flowchart showing an example of a control procedure of a control object (heater) according to the second embodiment.

A control procedure of the embodiment will now be described with reference to FIG. 12. FIG. 12 shows an interruption control procedure of 10 msec similar to the embodiment 1.

First, on the basis of the heater ON time t which is set in FIG. 10, a check is made to see if t is equal to 0 or not (step 12-1). If YES, a fuzzy inference subroutine to set the heater ON time t by the fuzzy inference is called. After that, the processing routine is returned.

On the other hand, if NO in step 12-1, a check is made to see if the heater ON time t is positive or negative (step 12-3). If it is positive, "1" is subtracted from the value of t (step 12-4). After that, a check is made to see if the heater ON time t is equal to 0 or not (step 12-5). If YES, a fuzzy inference subroutine in step 12-7 is called. After that, the processing routine is returned. If NO in step 12-5, a heater ON signal is output (step 12-6) and the processing routine is returned.

If t is negative in step 12-3, "1" is added to the value of t (step 12-8). A check is then made to see if the subsequent heater ON time t is equal to 0 or not (step 12-9). If YES, the fuzzy inference subroutine in step 12-7 is called and, thereafter, the processing routine is returned. If NO in step 12-9, a heater OFF signal is output (step 12-10) and the processing routine is returned.

Figure 13:
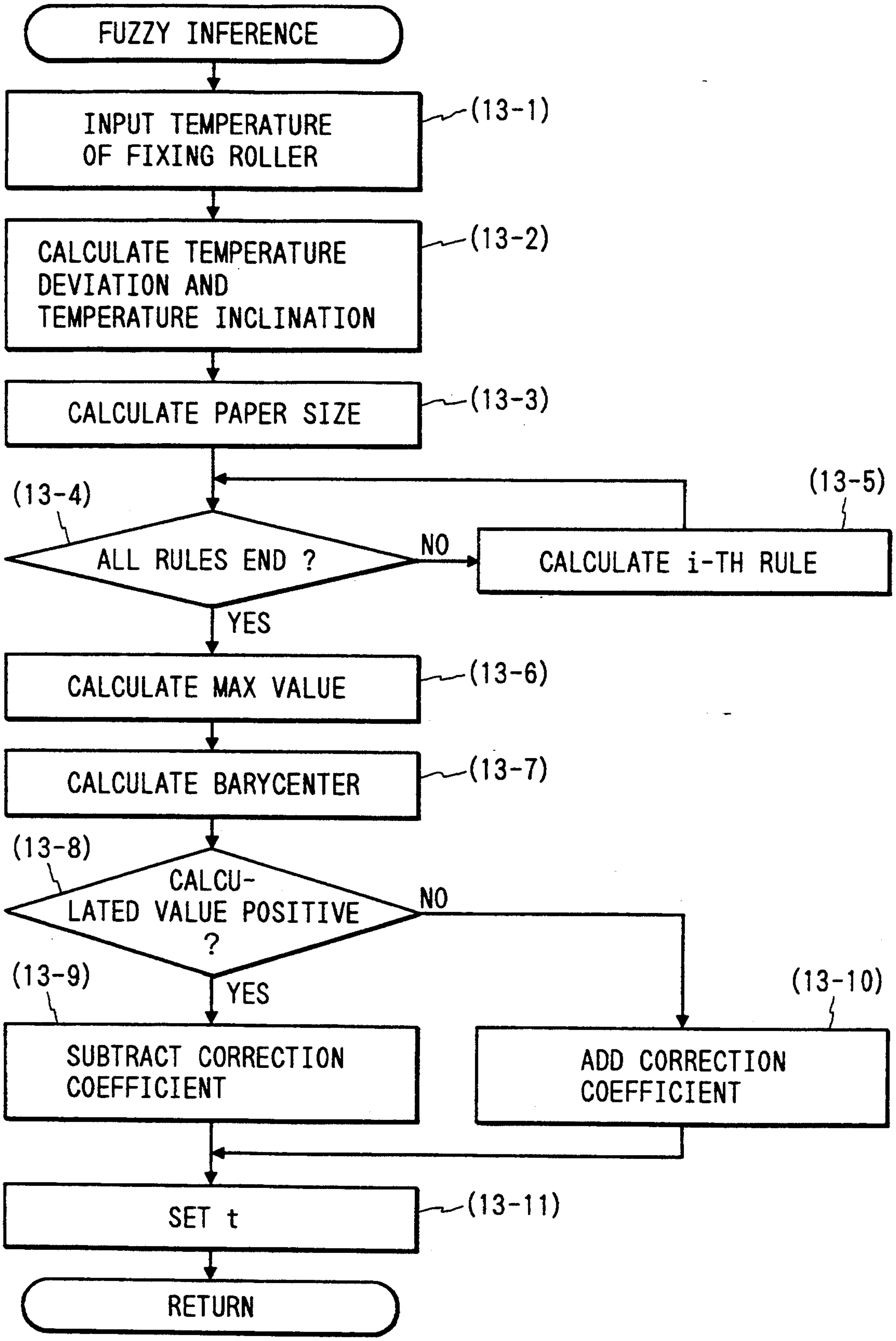
FIG. 13 is a flowchart showing an example of a fuzzy inference procedure according to the second embodiment.

The control procedure of the fuzzy inference subroutine will now be described with reference to the flowchart of FIG. 13.

First, a temperature of fixing roller is measured by the thermistor 163-2 (step 13-1). A deviation of the present temperature to a target temperature and a temperature inclination as a temperature change per unit time are calculated (step 13-2).

A paper area is calculated from the paper size which was designated by the user or the RDF 300 (step 13-3).

After that, a fuzzy set, that is, a conformity of the operation amounts to which the conformity for the fuzzy set of the stage amounts was reflected in accordance with each fuzzy rule is calculated by the foregoing method with respect to the set fuzzy rule (steps 13-4, 13-5). the maximum value of the fuzzy sets obtained by the respective rules is calculated (step 13-6). The operation amount of the highest possibility is calculated by obtaining a barycenter (step 13-7).

After the above process, in the embodiment 1, a value smaller than "1" has been multiplied to the calculated value; on the other hand, in the embodiment 2, a predetermined correction coefficient is subtracted or added in order to suppress the delay of the control system.

That is, a check is made to see if the calculated value is positive or negative (step 13-8). If it is positive, the correction coefficient is subtracted (step 13-9). If it is negative, the correction coefficient is added (step 13-10). The resultant value is set as a heater ON time t (step 13-11).

The correction coefficient has been stored in the ROM 803. The CPU 801 discriminated whether the calculated value is positive or negative. The CPU 801 executes the addition or subtraction by using the RAM 805 of a work area.

As described above, according to the embodiment of the invention, efficient image forming processes can be executed by giving the control in which complicated factors were considered to the image forming apparatus in which the fixed control has conventionally been performed for an environmental change. On the other hand, at this time, since the control amount is determined on the basis of a plurality of parameters, even if an error occurs in a part of input data, it is possible to prevent that a large error occurs in the control amount.

As will be obviously understood from the above description, according to the embodiment 2, by providing the dedicated means for correcting the delay of the control system which executes the fuzzy inference, the correction of the delay can be independently controlled and the correction amount can be easily changed in accordance with a variation among machines or aging changes thereof.

Thus, the electric power consumption of the image forming apparatus, paper jam, damage, and the like can be always minimized. Further, the process control or the like can be optimally executed. Therefore, the image quality is improved and the reliability of image formation can be remarkably improved.

Embodiment 3

In the above embodiment 1, there is disclosed an image forming apparatus in which by providing the changing means for changing the operation amount obtained by the fuzzy inference and correcting the delay, the apparatus can cope with the delay of the control system and, further, by changing the change amount by the changing means in correspondence to a variation among apparatuses or aging changes thereof, even in the control system using a fuzzy inference, the delay of the control system can be properly corrected.

That is, the invention of the embodiment 1 provides an image forming apparatus comprising: control amount detecting means for detecting control amounts of a control object which is provided for the apparatus; state amount means for obtaining state amounts regarding the control amounts which are detected by the control amount detecting means; operation amount control means for giving operation amounts to control the control amounts; function memory means for storing functions to specify fuzzy sets with respect to each of the state amounts and the operation amounts; rule memory means for storing rules in which the state amounts and the operation amounts are qualitatively made correspond; inferring means for obtaining a degree at which the state amounts obtained by the stage amount means belong to the fuzzy set in accordance with the rule on the basis of the function regarding the state amounts, for calculating the fuzzy set as an inference result of the rule from theresultant degree and the function regarding the operation amount, and for obtaining a representative value of the calculated fuzzy sets as an operation amount of the operation amount control means; and changing means for changing the operation amount obtained by the inferring means in accordance with a predetermined rule and for setting to an operation amount which is given by the operation amount control means, wherein the control object is controlled in accordance with the operation amount obtained by the changing means.

According to the invention of the embodiment, in order to eliminate the influence by the fluctuation in delay amount of a control system due to a variation in manufacturing of machines, aging changes, and the like and to enable the delay of the control system to be accurately corrected, there is provided an image forming apparatus comprising: state amount detecting means for detecting state amounts of a control object which is provided in the apparatus; control means for giving operation amounts to the control object; rule memory means for making the relations between the state amounts and the operation amounts correspond as qualitative rules; function memory means of functions in each of which the state amounts and the operation amounts are expressed by at least one fuzzy set; inferring means for calculating a degree at which the operation amount belongs to the set of operation amounts from a degree at which the state amount belongs to the set of state amounts in accordance with the rule and for inferring the operation amount of the highest possibility; calculating means for calculating the rule which is dominant tothe result of the inference; memory means for storing a transition order of the rule which is dominant to the inference result; and weighting means for applying a weight to the rule which is next dominant when the inferring means executes the inference and for changing the weight.

A whole construction of the embodiment and the like are similar to those of the embodiment 1. Therefore, the descriptions of thee common portions are omitted.

1. Operation example

The means for calculating the rule which is dominant to the inference result in the embodiment will be first described.

Explanation will now be made with respect to the example of FIG. 7. The above MIN operation is executed for the inputs x, y, and z and a trapezoid shown by the hatched portion S is obtained. An area of trapezoid is considered to be a dominant degree of the (rule 1). The dominant degrees (areas of the trapezoids) obtained from the respective rules are compared. The maximum dominant degree is set to a rule which is dominant to the inference result. In the embodiment, the (rule 1) corresponds to the dominant rule.

The transition order of the rule which is dominant to the inference result will now be described.

Figure 14:
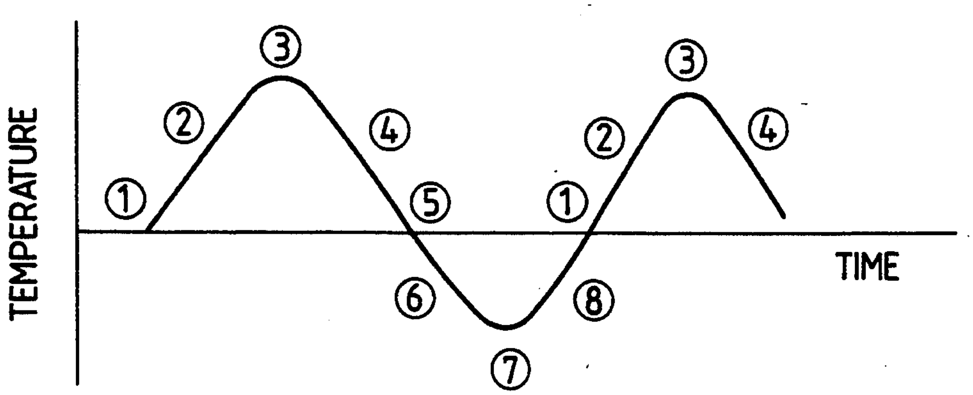
FIG. 14 is a graph showing the relation between a temperature of a fixing device as a control object and a time in the third embodiment of the invention.
Figure 15:
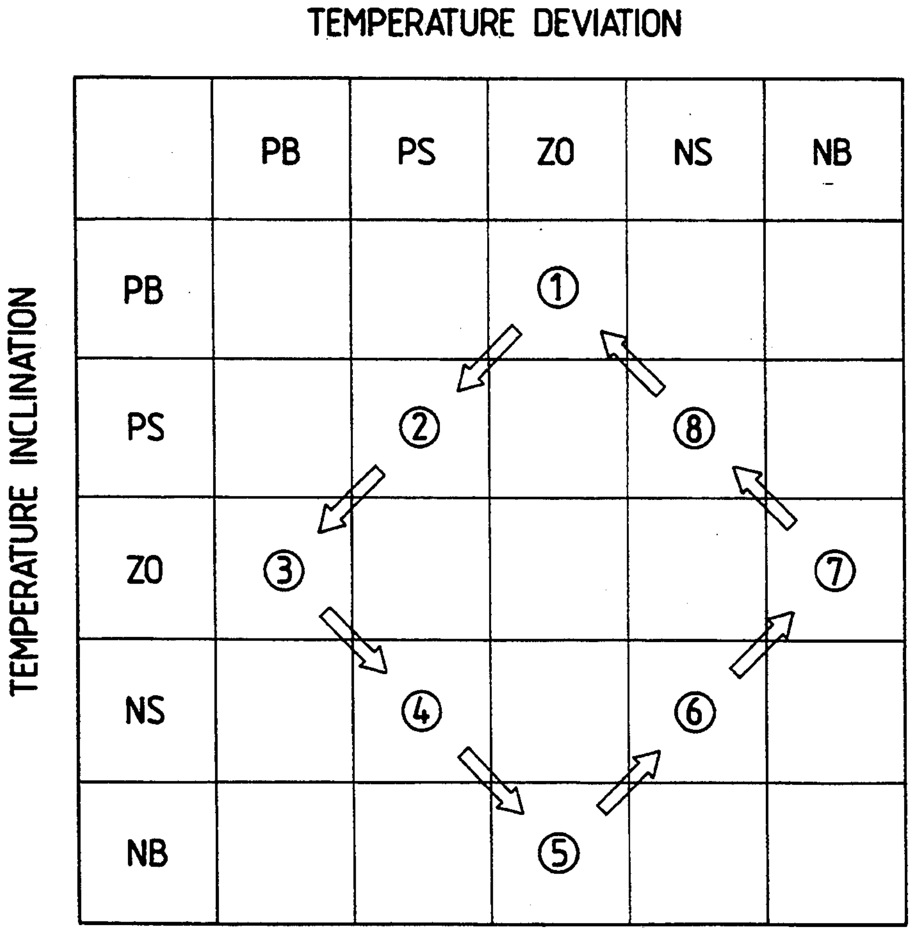
FIG. 15 is an explanatory diagram showing a temperature deviation and a temperature inclination at each characteristic point in FIG. 14.

FIG. 14 shows the relation between the temperature of the fixing device and the time. FIG. 15 shows the relation between the temperature deviations and the temperature inclinations at characteristic points in FIG. 14. Reference numerals (1) to (8) in the diagrams denote the corresponding points, respectively. As mentioned above, the characteristic points shift in accordance with a certain rule. At each of the characteristic points, the rule including each characteristic is dominant. That is, at point (1), the rule including the antecedent part such that {if temperature inclination=PB and temperature deviation=ZO} is dominant. The transition order of such a dominant rule is stored in the RAM 805.

In the embodiment, in consideration of the transition order of the dominant rule, when the inference is further executed, a weight is applied to the rule which becomes dominant next and the weight is changed, thereby enabling the delay of the control system to be always accurately corrected irrespective of a fluctuation of the delay amount (for instance, fluctuation of the delay amount of the thermistor due to an aging change or the like). The CPU 801 executes the weighting process on the basis of weighting data stored in the RAM 805.

Figure 16:
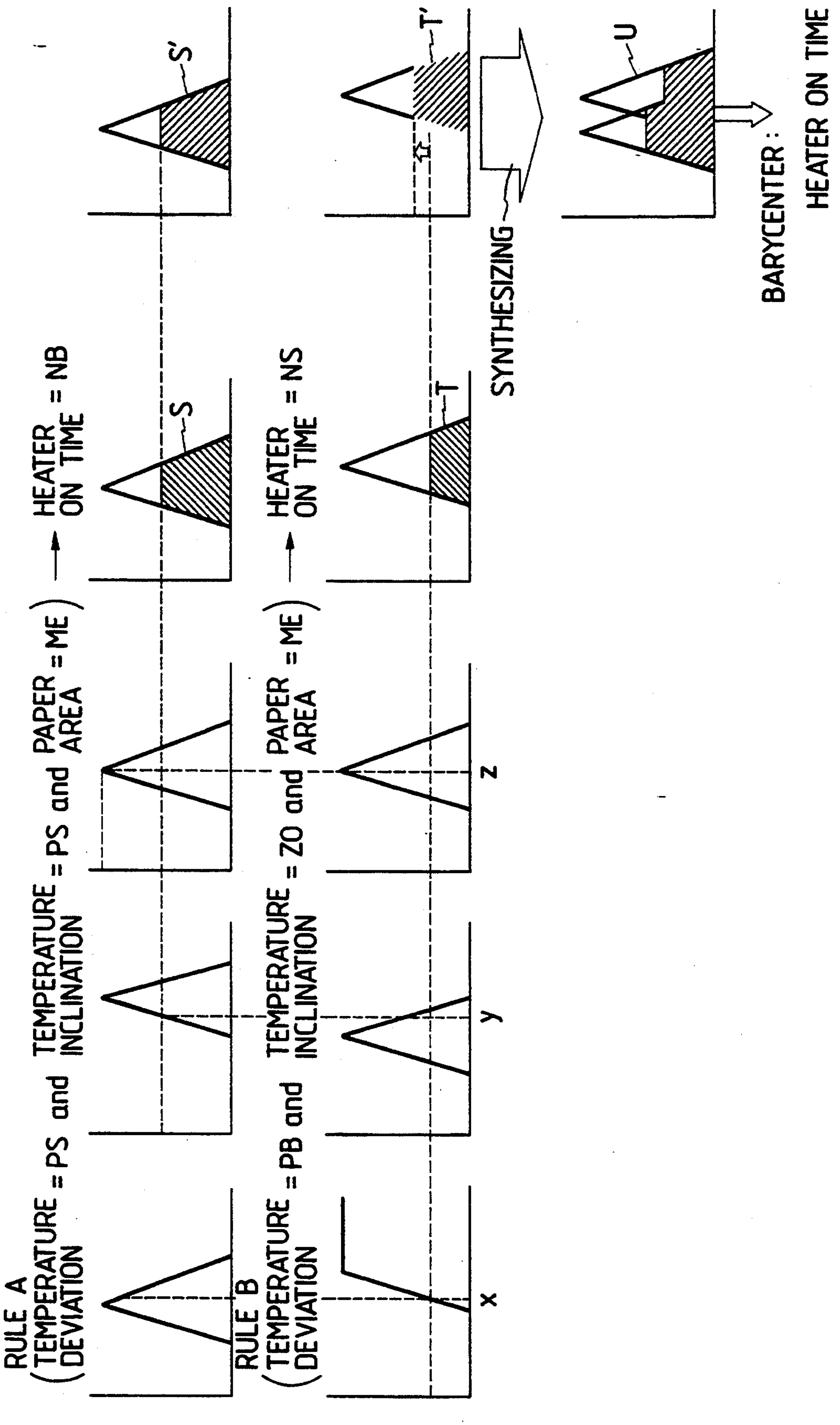
FIG. 16 is an explanatory diagram for explaining a method of a fuzzy inference which was applied to the embodiment.

FIG. 16 relates to the embodiment and shows an exmaple in which a fuzzy inference is executed by changing the weight of the rule which becomes dominant next.

The dominant rule in the input values x, y, and z in FIG. 16 is the (rule A) and corresponds to (1) in FIG. 15. Therefore, it will be understood that the rule which becomes dominant nextis the rule (2) (rule B). Therefore, T' is obtained by multiplying a certain correction coefficient to a heater ON time T which is obtained from the (rule B) and the next barycenter is calculated, thereby deciding the heater ON time.

Figure 17:
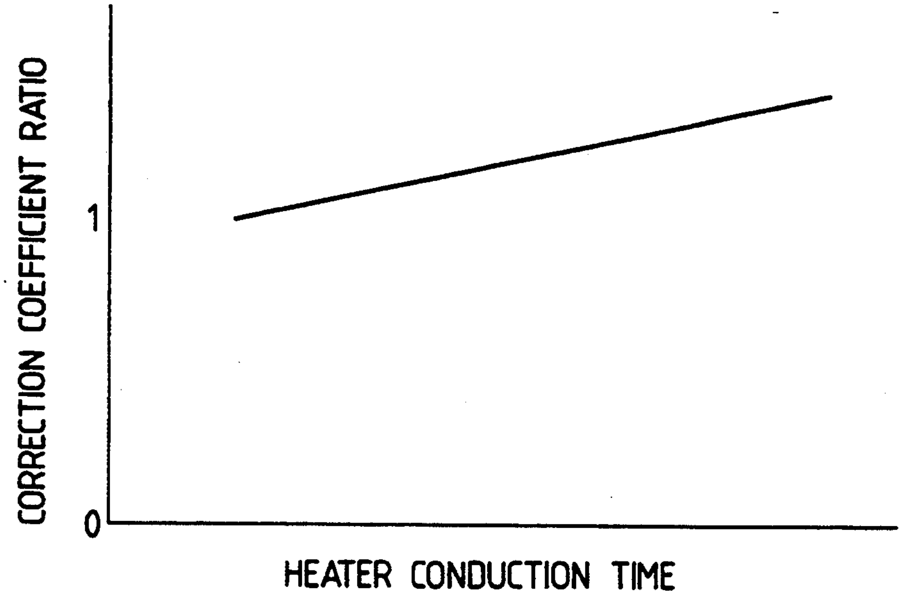
FIG. 17 is a graph showing a ratio of a correction coefficient to an initial set value according to the embodiment.

The initial value of the correction coefficient is determined at the time of the inspection, shipping from the factory, or the like and can be stored into the ROM 803 or the RAM 805 which is backed up by, for example, a battery. After that, to reflect a change in delay amount due to the aging changes of the thermistor and the like, the correction coefficient is changed in accordance with a function shown in FIG. 17. The CPU 801 executes the above operation. The function of FIG. 17 relates to a ratio of the value upon initialization. That is, for instance, it is sufficient to provide means for integrating the heater conduction time and to provide a look-up table of the integrated value and the ratio into the ROM orthe like and to multiply the ratio to the initial value ofthe correction coefficient (weight) by referring to the look-up table by the CPU 801.

2. Control means

A control procedure of the embodiment is similar to that shown in FIG. 12 and shows an example of a control procedure which is activated by an interruption every predetermined time (10 msec in the embodiment).

Figure 18:
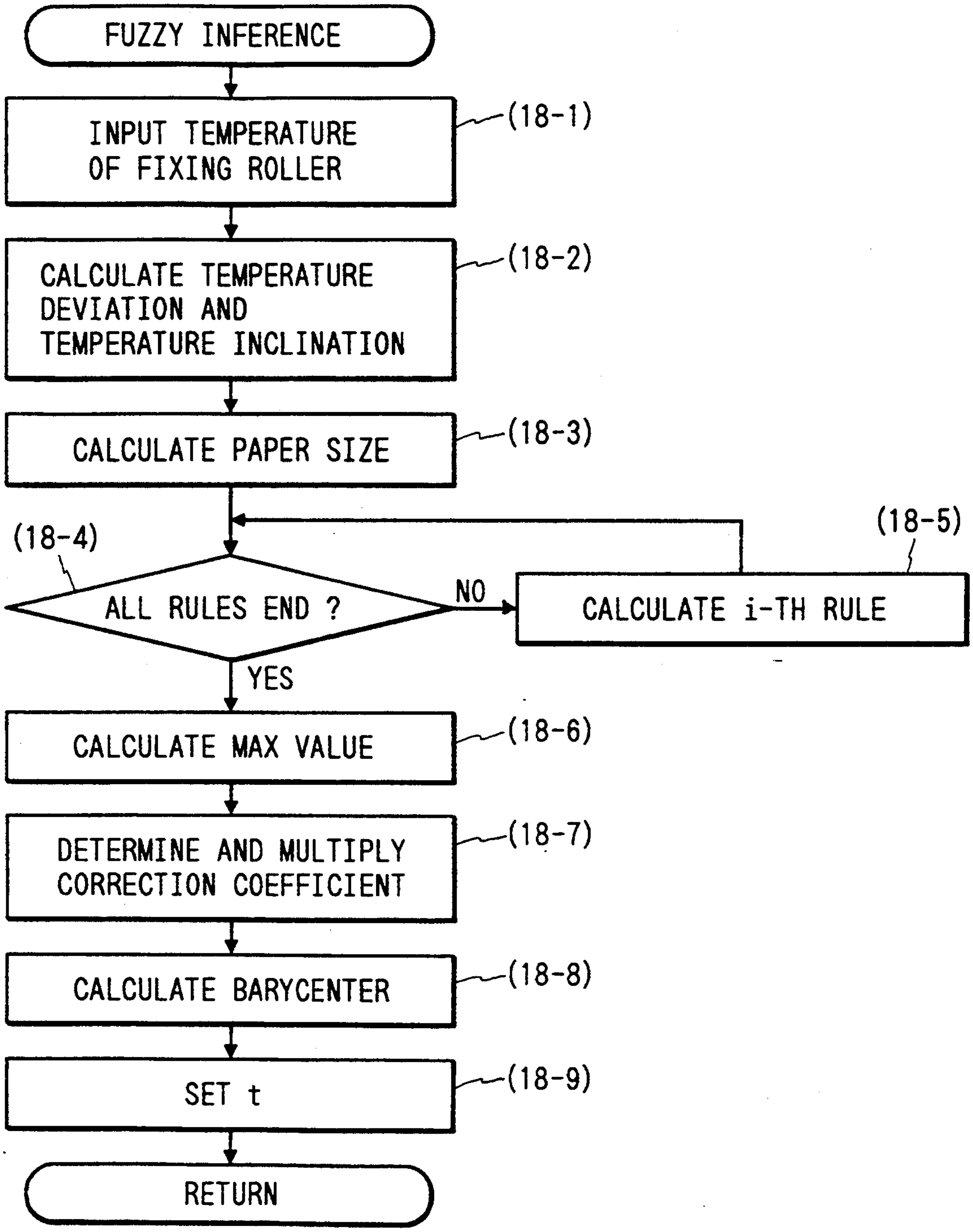
FIG. 18 is a flowchart showing an example of a fuzzy inference procedure according to the embodiment.

An example of an operation procedure of a fuzzy inference subroutine will now be described with reference to a flowchart shown in FIG. 18.

First, a temperature of fixing roller is measured by the thermistor 163-2 (step 18-1). A deviation of the present temperature to a target temperature and a temperature inclination as a temperature change per unit time are calculated (step 18-2). A paper area is also calculated from the paper size which was designated by the user of the RDF 300 (step 18-3).

After that, with respect to all of the fuzzy rules shown in FIG. 6, a degree at which the operation amount belongs to the fuzzy set of the operation amounts is calculated from a degree at which the stage amount belongs to the fuzzy set of the state amounts in accordance with each of the fuzzy rules by the foregoing method (steps 18-4, 18-5). The maximum value of the sets which belong to the respective rules is calculated (step 18-6). The present optimum correction coefficient is calculated and determined from the ratios which have been described with respect to FIG. 17 and the correction coefficient is multiplied to the consequent part of the rule which becomes dominant next (step 18-7). The operation amount of the highest possibility is calculated by obtaining a barycenter (step 18-8) and is set as a heater ON time t (step 18-9).

The heater ON time t is used when the heater ON time is controlled in the interruption of 10 msec and the value in which 10 msec is used as a unit is set as mentioned above.

Embodiment 4

Another embodiment of means for applying a weight to the rule which becomes dominant next when a fuzzy inference is executed and for changing the weight will now be described hereinbelow.

When all of the fuzzy inferences shown in FIG. 6 are executed, in the embodiment 4, a predetermined value is added to or is subtracted from the consequent part of the rule which becomes dominant next. It is now assumed that the above process is executed in such a direction as to suppress the influence by the delay, that is, a predetermined value is added.

Figure 19:
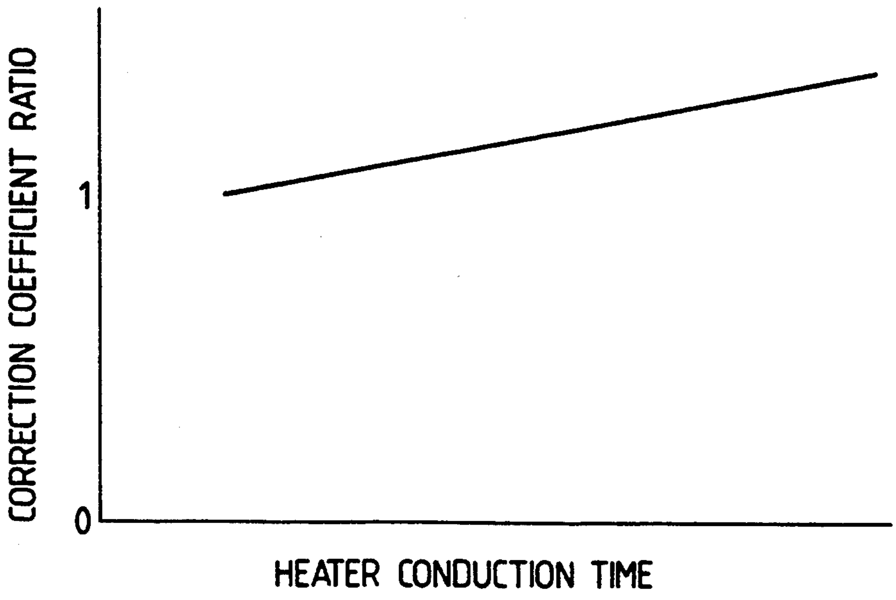
FIG. 19 is a graph showing a ratio of a correction value to an initial set value according to the fourth embodiment of the invention.

The addition value can be stored into the ROM 803 or the RAM 805 which is backed up by a battery. The initial value of the addition value is determined at the time of the inspection or the shipping from the factory or the like. After that, to reflect a change in delay amount due to aging changes of the thermistor and the like, the addition value is changed in accordance with a function shown in FIG. 19. The CPU 801 can execute the above operation in a manner similar to the embodiment 1. The function of FIG. 19 relates to a ratio to the value upon initialization.

Figure 20:
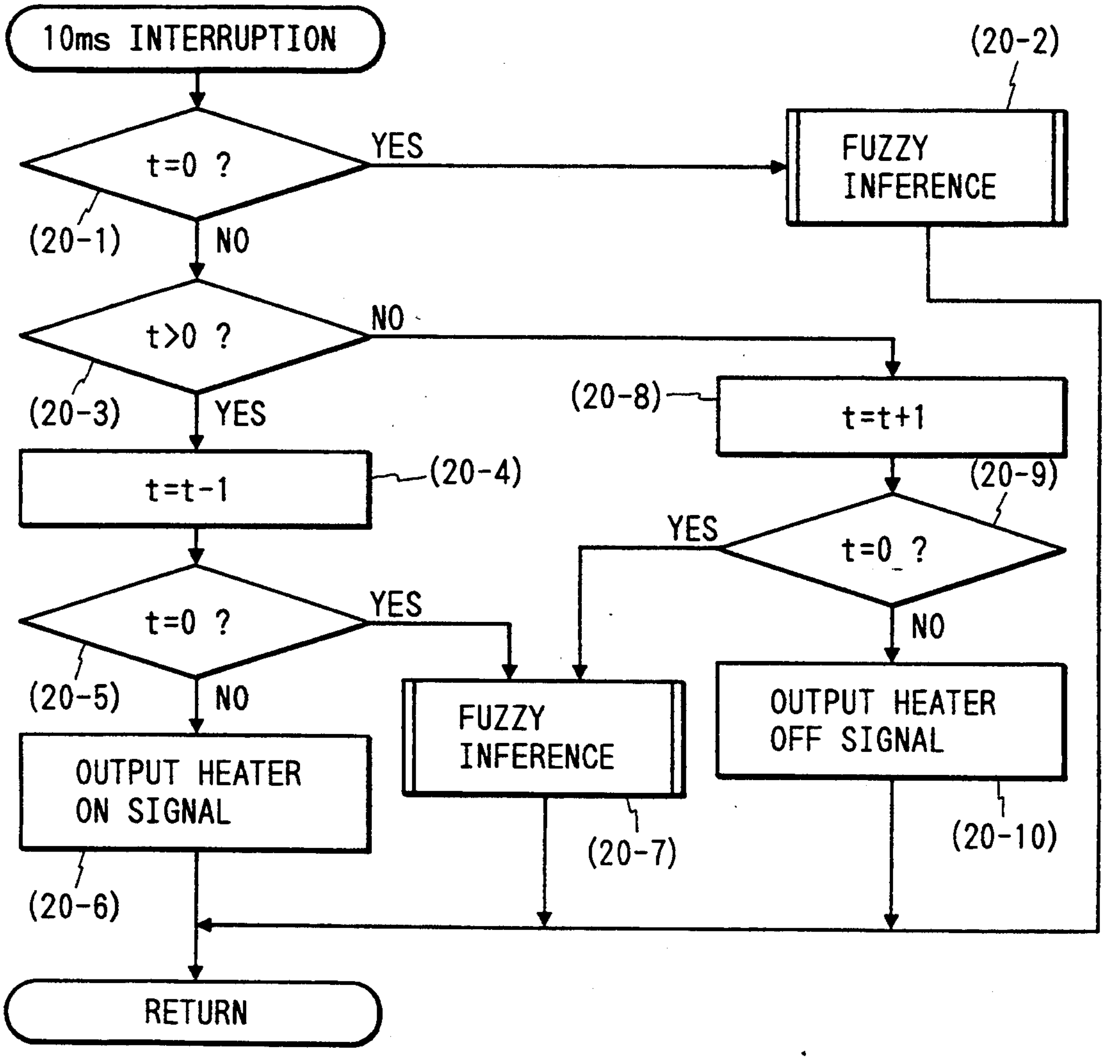
FIG. 20 is a flowchart showing an example of a control procedure of a control object (heater) according to the fourth embodiment.

A control procedure of the embodiment will now be described with reference to FIG. 20. FIG. 20 shows an example of a control procedure which is activated by an interruption every predetermined time (for instance, 10 msec).

Figure 21:
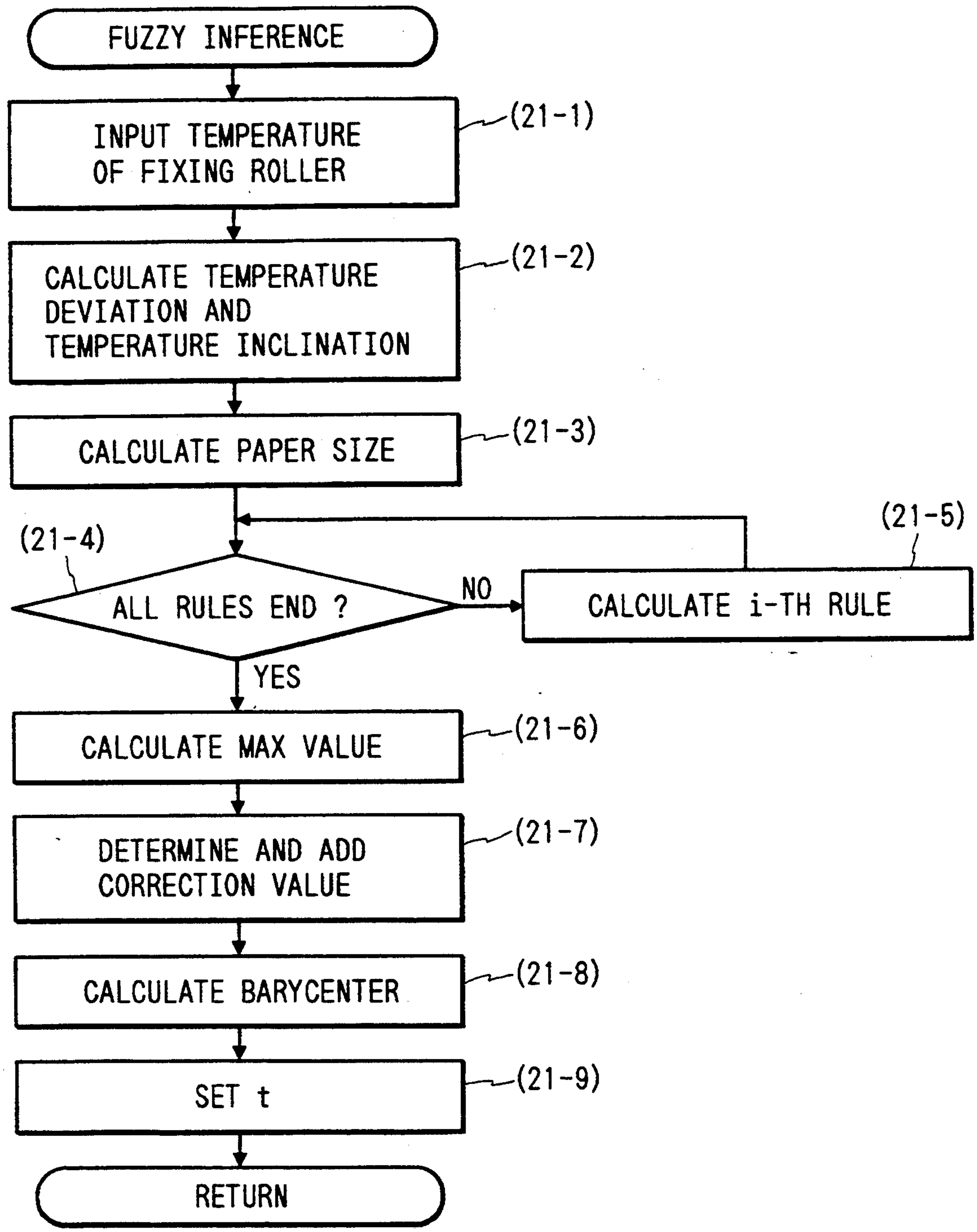
FIG. 21 is a flowchart showing an example of a fuzzy inference procedure according to the fourth embodiment.

First, on the basis of the heater ON time t which is set in FIG. 21 of a conventional technique, a check is made to see if t is equal to 0 or not (step 20-1). If YES, a fuzzy inference subroutine to set the heater ON time t by a fuzzy inference is called. After that, the processing routine is returned.

On the other hand, if NO in step 20-1, a check is made to see if the heater ON time t is positive or negative (step 20-3). If it is positive, "1" is subtracted from the value of t (step 20-4). After that, a check is made to see if t is equal to 0 or not (step 20-5). If YES, the fuzzy inference subroutine (step 20-7) is called and, thereafter, the processing routine is returned. On the other hand, if NO in step 20-5, the heater is turned on (step 20-6) and the processing routine is returned.

If t is negative in step 20-3, "1" is added to the value of t (step 20-8). Then, a check is made to see if the subsequent heater ON time t is equal to "0" or not (step 20-9). If YES, the fuzzy inference subroutine (step 20-7) is called and, thereafter, the processing routine is returned. On the contrary, if NO in step 20-9, the heater is turned off (step 20-10) and the processing routine is returned.

An example of the operation procedure of the fuzzy influence subroutine according to the embodiment will now be described with reference to a flowchart shown in FIG. 21.

First, a temperature of fixing roller is measured by the thermistor 163-2 (step 21-1). A deviation of the present temperature to a target temperature and a temperature inclination as a temperature change per unit time are calculated (step 21-2). A paper area is also calculated from the paper size which was designated by the user or the RDF 300 (step 21-3). After that, with respect to all of the fuzzy rules shown in FIG. 6, a degree at which the operation amount belongs to the fuzzy set of the operation amounts is calculated from a degree at which the state amount belongs to the fuzzy set of the state amounts in accordance with each of the fuzzy rules by the foregoing method (steps 21-4, 21-5). The maximum value of the sets which belong to the rules is calculated (step 21-6). In a manner similar to the foregoing step 18-7, the optimum addition value is obtained and a predetermined value is added to the consequent part of the rule which becomes dominant next (step 21-7). The operation amount of the highest possibility is calculated by obtaining a barycenter (step 21-8) and is set as a heater ON time t (step 21-9).

The heater ON time t is also used when the heater ON time is controlled in the interruption of 10 msec and a value in which 10 msec is used as a unit is set in the embodiment 4.

Others

Although the above embodiments have been described with respect to the case where the fixing means was used as a controlobject, the similar control can be also performed to each means in the apparatus such as charging means, exposing means, copy transfer means, recording medium feeding means, conveying means, image forming mode setting means, or the like.

For instance, a room temperature, a humidity, an atmospheric pressure, and the like can be used as state amounts in the copy transfer means. A current which is applied upon charging can be used as an operation amount.

A potential of the photo sensitive material, a developing bias, and the like can be used as state amounts in the exposing means and a light-on voltage of an exposing lamp can be used as an operation amount.

On the other hand, a conveying speed, conveying speed inclination, a humidity, and the like can be used as state amounts in the conveying means and a conveying speed control voltage can be used as operation amounts.

On the other hand, although the embodiment has been described with respect to an example of the fixing device of the electrophotographic copying apparatus, the image forming apparatus of the invention is not always limited to the electrophotographic copying apparatus but can be also applied to the ink jet printer, thermal printer, or the like. For example, although the heater control has been described as an example for the fixing device of the embodiment, if means for drying the ink which was printed by the ink jet printer is used, such means can be also incorporated in the fixing device as a broad meaning. Further, the invention can be also applied to means other than the fixing device, for instance, an optical system driving motor control or the like.

The algorithm of the foregoing fuzzy inference has been described as an example and no problem will occur even if the algorithm is modified. For example, in place of obtaining a barycenter of the maximum value of the area when a plurality of rules are synthesized, a value of an axis of abscissa to a value such that an axis ofordinate becomes maximum can be also used as a result of the inference. On the other hand, the number and contents of fuzzy rules can be also modified on the basis of the experimental rules.

On the other hand, instead of a method whereby the fuzzy sets and rules are independently stored in the RAM and ROM and the operation of the fuzzy inference is performed upon control, if results which have previously been inferred with respect to the combinations of the inputs of all of the state amounts are preliminarily stored in a look-up table (ROM), an output can be easily obtained in accordance with the input of the state amounts.

On the other hand, the apparatus can be also constructed by a hardware using gate circuits.

The multiplication of the correction coefficient is not executed by the CPU 801 but can be also performed by a multiplying circuit which is additionally provided.

The correction coefficient is not limited to the foregoing example but a linear or non-linear function can be also used.

As described above, according to the embodiments of the invention, the efficient image forming processes can be executed by giving the control in which consideration was made to complicated factors to the image forming apparatus in which the fixed control has conventionally been executed to an environmental change. On the other hand, at this time, since a control amount is determined on the basis of a plurality of parameters, even if an error occurred in a part of the input data, it is possible to prevent that a large error occurs in the control amount.

As mentioned above, according to the invention, by providing the means for changing a weight of the rule which becomes dominant next when a fuzzy inference is executed, that is, by providing the dedicated means for correcting a fluctuation in delay amount of the control system which occurs due to a variation in manufacturing of the detecting means and control objects, aging changes thereof, and the like, the correction for the delay can be independently controlled and the operation amount can be easily accurately corrected irrespective of a variation among machines or aging changes thereof. Thus, the electric power consumption of the image forming apparatus, paper jam, damage, or the like can be always minimized. Further, the processing control or the like can be optimally performed. Thus, the image quality is improved and the reliability of the image formation can be remarkably improved.

What is claimed is:

1. An image forming apparatus comprising:

a) a plurality of processing means for forming an image;

b) detecting means for detecting at least one state amount regarding a control of said processing means;

c) inference operating means for using a predetermined rule to infer a control amount which is used to control said processing means on the basis of the state amount and for outputting the control amount; and d) setting means for setting the predetermined rule to said inference operating means, wherein said setting means selects a different rule from among plural rules stored in a memory at predetermined time intervals, and sets the selected rule to said inference operating means.

2. An apparatus according to claim 1, wherein said apparatus is an image forming apparatus in which a latent image is formed onto a photo sensitive material and is visualized by developing means and a visual image is transferred onto a transfer paper, and said processing means include at least one of charging means, exposing means, developing means, transfer means, paper feeding means, conveying means, fixing means, and image forming mode setting means.

3. An apparatus according to claim 1, further comprising correcting means for correcting the control amount output by said inference operating means.

4. An apparatus according to claim 3, wherein said correcting means multiplies a predetermined coefficient to the control amount.

5. An apparatus according to claim 4, wherein said coefficient is changed in accordance with a predetermined qualitative rule.

6. An apparatus according to claim 3, wherein the correcting means adds or subtracts a predetermined value to/from the control amount obtained by the inference operating means.

7. An apparatus according to claim 6, wherein said predetermined value which is added or subtracted is variable.

8. An apparatus according to claim 7, wherein said predetermined value which is added or subtracted is changed in accordance with a predetermined qualitative rule.

9. An image forming apparatus having a plurality of processing means for executing a process to form an image onto a material to be recorded, comprising:

a) a detector to detect at least one state amount regarding said process;

b) a memory to store plural rules for qualitatively making the state amount correspond to a control amount to control at least one of said processing means;

c) function storing memory for storing functions in each of which the state amount and the control amount are expressed by at least one fuzzy set;

d) inference operating means for inferring the control amount from the state amount in accordance with a predetermined rule; and e) setting means for setting the predetermined rule to said inference operating means, wherein said setting means selects a different rule from among the plural rules stored in said memory means at predetermined time intervals, and sets the selected rule to said inference operating means.

10. An apparatus according to claim 9, wherein said apparatus is an image forming apparatus in which a latent image is formed onto a photo sensitive material and is visualized by developing means and a visual image is transferred onto a transfer paper, and said processing means include at least one of charging means, exposing means, developing means, transfer means, paper feeding means, conveying means, fixing means, and image forming mode setting.

11. An apparatus according to claim 9, further comprising correcting means for correcting the control amount obtained by said inference operating means.

12. An apparatus according to claim 11, wherein said correcting means multiplies a predetermined coefficient to the control amount.

13. An apparatus according to claim 12, wherein said coefficient is changed in accordance with a predetermined qualitative rule.

14. An apparatus according to claim 11 wherein the correcting means adds or subtracts a predetermined value to/from the control amount obtained by the interference operating means.

15. An apparatus according to claim 14, wherein said predetermined value which is added or subtracted is variable.

16. An apparatus according to claim 15, wherein said predetermined value which is added or subtracted is changed in accordance with a predetermined qualitative rule.

17. An image forming apparatus having a plurality of processing means for executing a process to form an image onto a recording material, comprising:

a) a detector to detect at least one state amount regarding said process;

b) a memory to store plural rules for qualitatively making the state amount correspond to a control amount to control at least one of said processing means;

c) a function storing memory to store functions in each of which the state amount and the control amount are expressed by at least one fuzzy set;

d) inference operating means for inferring the control amount from the state amount in accordance with a predetermined rule; and e) setting means for setting the predetermined rule to said inference operating means, wherein, in accordance with a delay in the process, said setting means selects a different rule from among the plural rules stored in said memory at predetermined time intervals, and sets the selected rule to said inference operating means.

18. An apparatus according to claim 17, wherein said apparatus is an image forming apparatus in which a latent image is formed onto a photo sensitive material and is visualized by developing means and a visual image is transferred onto a transfer paper, and said processing means include at least one of charging means, exposing means, developing means, transfer means, paper feeding means, conveying means, fixing means, and image forming mode setting means.

19. An apparatus according to claim 17, wherein said setting means has:

determining means for determining a dominant rule in the inference by the inference operating means, and a transition order memory to store a transition order of the dominant rule in said inference.

20. An apparatus according to claim 19, wherein said setting means applies a weight to the dominant rule which was determined by the determining means and changes said weight in accordance with the transition order.

21. An apparatus according to claim 20, wherein the setting means multiplies a predetermined coefficient to a consequent part of the rule.

22. An apparatus according to claim 21, wherein said predetermined coefficient conforms with a predetermined qualitative rule.

23. An apparatus according to claim 20, wherein the setting means adds or subtracts a predetermined value to/from a consequent part of the rule.

24. An apparatus according to claim 23, wherein said predetermined value conforms with a predetermined qualitative rule.

25. An apparatus according to claim 19, wherein the determining means determines the rule in which an influence by a consequent part of the rule is maximum as adominant rule.

26. An apparatus for controlling a processing condition of an object, comprising:

a) extracting means for extracting at least one state amount regarding a control of the processing condition;

b) memory means for storing plural rules for qualitatively making the state amount correspond to a control amount to control the processing condition;

c) a function-storing memory for storing functions in each of which the state amount and the control amount are expressed by at least one fuzzy set;

d) inference operating means for inferring the control amount from the state amount in accordance with a predetermined rule and outputting the control amount; and e) setting means for setting the predetermined rule to said inference operating means, wherein said setting means selects a different rule from among the plural rules stored in said memory at predetermined time intervals, and sets the selected rule to said inference operating means.

27. An apparatus according to claim 26, wherein said apparatus is an image forming apparatus in which a latent image is formed onto a photosensitive material and is visualized by developing means and a visual image is transferred onto a transfer paper, and said processing means include at least one of charging means, exposing means, developing means, transfer means, paper feeding means, conveying means, fixing means and image forming mode setting means.

28. An apparatus for controlling a processing condition of an object, comprising:

a) extracting means for extracting at least one state amount regarding a control of the processing condition;

b) memory means for storing plural rules for qualitatively making the state amount correspond to a control amount to control the processing condition;

c) a function-storing memory for storing functions in each of which the state amount and the control amount are expressed by at least one fuzzy set;

d) inference operating means for inferring the control amount from the state amount in accordance with a predetermined rule and outputting the control amount;

e) setting means for setting the predetermined rule to said inference operating means; and f) correcting means for correcting the control amount obtained by the inference operating means, wherein said setting means selects a different rule from among the plural rules stored in said memory at predetermined time intervals, and sets the selected rule to said inference operating means.

29. An apparatus for controlling a processing condition of an object, comprising:

a) extracting means for extracting at least one state amount regarding a control of the processing condition;

b) memory means for storing plural rules for qualitatively making the state amount correspond to a control amount to control the processing condition;

c) a function-storing memory for storing functions in each of which the state amount and the control amount are expressed by at least one fuzzy set;

d) inference operating means for inferring the control amount from the state amount in accordance with a predetermined rule and outputting the control amount;

e) setting means for setting the predetermined rule to said inference operating means; and f) correcting means for correcting the control amount obtained by the inference operating means, wherein said setting means selects a different rule from among the plural rules stored in said memory at predetermined intervals, and sets the selected rule to said inference operating means, and wherein said correcting means multiplies a predetermined coefficient to correcting means for correcting the control amount.

30. An apparatus for controlling a processing condition of an object, comprising:

a) extracting means for extracting at least one state amount regarding a control of the processing condition;

b) memory means for storing plural rules for qualitatively making the state amount correspond to a control amount to control the processing condition;

c) a function-storing memory for storing functions in each of which the state amount and the control amount are expressed by at least one fuzzy set;

d) inference operating means for inferring the control amount from the state amount in accordance with a predetermined rule and outputting the control amount;

e) setting means for setting the predetermined rule to said inference operating means; and f) correcting means for correcting the control amount obtained by the inference operating means, wherein said setting means selects a different rule from among the plural rules stored in said memory at predetermined time intervals, and sets the selected rule to said inference operating means, wherein said correcting means multiplies a predetermined coefficientto the control amount, and wherein said coefficient is changed in accordance with a predetermined qualitative rule.

31. An apparatus for controlling a processing condition of an object, comprising:

a) extracting means for extracting at least one state amount regarding a control of the processing condition;

b) memory means for storing plural rules for qualitatively making the state amount correspond to a control amount to control the processing condition;

c) a function-storing memory for storing functions in each of which the state amount and the control amount are expressed by at least one fuzzy set;

d) inference operating means for inferring the control amount from the state amount in accordance with a predetermined rule and outputting the control amount;

e) setting means for setting the predetermined rule to said inference operating means; and f) correcting means for correcting the control amount obtained by the inference operating means, wherein said setting means selects a different rule from among the plural rules stored in said memory at predetermined time intervals, and sets the selected rule to said inference operating means, wherein said correcting means multiplies a predetermined coefficient to the control amount, and wherein the correcting means adds or subtracts a predetermined value to/from the control amount obtained by the inference operating means.

32. An apparatus for controlling a processing condition of an object, comprising:

a) extracting means for extracting at least one state amount regarding a control of the processing condition;

b) memory means for storing plural rules for qualitatively making the state amount correspond to a control amount to control the processing condition;

c) a function-storing memory for storing functions in each of which the state amount and the control amount are expressed by at least one fuzzy set;

d) inference operating means for inferring the control amount from the state amount in accordance with a predetermined rule and outputting the control amount;

e) setting means for setting the predetermined rule to said inference operating means; and f) correcting means for correcting the control amount obtained by the inference operating means, wherein said setting means selects a different rule from among the plural rules stored in said memory at predetermined time intervals, and sets the selected rule to said inference operating means, wherein the correcting means adds or subtracts a predetermined value to/from the control amount obtained by the inference operating means, and wherein said predetermined value which is added or subtracted is variable.

33. An apparatus for controlling a processing condition of an object, comprising:

a) extracting means for extracting at least one state amount regarding a control of the processing condition;

b) memory means for storing plural rules for qualitatively making the state amount correspond to a control amount to control the processing condition;

c) a function-storing memory for storing functions in each of which the state amount and the control amount are expressed by at least one fuzzy set;

d) inference operating means for inferring the control amount from the state amount in accordance with a predetermined rule and outputting the control amount;

e) setting means for setting the predetermined rule to said inference operating means; and f) correcting means for correcting the control amount obtained by the inference operating means, wherein said setting means selects a different rule from among the plural rules stored in said memory at predetermined time intervals, and sets the selected rule to said inference operating means, wherein the correcting means adds or subtracts a predetermined value to/from the control amount obtained by the inference operating means, wherein said predetermined value, which is added or subtracted, is variable and is changed in accordance with a predetermined qualitative rule.

34. An image forming method, comprising:

a) a detecting step of detecting at least one state amount regarding a control of processing means;

b) an inference operating step of inferring a control amount which is used to control the processing means on the basis of the state amount and outputting the control amount; and c) a setting step of setting the predetermined rule in said inference operating step, wherein in said setting step a different rule is selected from among plural rules stored in a memory at predetermined time intervals.

35. A method for controlling a processing condition of an object, comprising:

a) an extracting step of extracting at least one state amount regarding a control of the processing condition;

b) an inference operating step of inferring a control amount from the state amount in accordance with a predetermined rule and outputting the control amount; and c) a setting step of setting the predetermined rule in said inference operating step, wherein in said setting step a different rule is selected from among plural rules stored in memory means at predetermined time intervals.

* * * * *

UNITED STATES PATENT AND TRADEMARK OFFICE

CERTIFICATE OF CORRECTION

PATENT NO. : 5,377,321

DATED : Dec. 27, 1994

INVENTOR(S) : Tokuharu Kaneko, et al.

It is certified that error appears in the above-indentified patent and that said Letters Patent is hereby corrected as shown below:

COLUMN 5:

Line 46, "Carlsont's" should read --Carlson's--.

COLUMN 11:

Line 26, "area=" should read --area=ME,--.

COLUMN 12:

Line 27, "timeto" should read --time to--.

UNITED STATES PATENT AND TRADEMARK OFFICE
CERTIFICATE OF CORRECTION

PATENT NO. : 5,377,321

DATED : Dec. 27, 1994

INVENTOR(S) : Tokuharu Kaneko, et al.

It is certified that error appears in the above-indentified patent and that said Letters Patent is hereby corrected as shown below:

COLUMN 21:

Line 31, "setting." should read --setting means.--.

COLUMN 22:

Line 42, "adominant" should read --a dominant--.

COLUMN 24:

Line 17, "coefficientto" should read --coefficient to--.

Signed and Sealed this

Thirteenth Day of June, 1995

Attest:

BRUCE LEHMAN

*Attesting Officer* *Commissioner of Patents and Trademarks*